Jan. 27, 1970 J. F. BENE ET AL 3,492,646

CROSS CORRELATION AND DECISION MAKING APPARATUS

Filed April 26, 1965 9 Sheets-Sheet 1

✱ CONFLICT
P PARITY BIT

INVENTORS

JACK F. BENE
GERALD A. GARRY

BY Donald F Voss

ATTORNEY

Jan. 27, 1970 J. F. BENE ET AL 3,492,646

CROSS CORRELATION AND DECISION MAKING APPARATUS

Filed April 26, 1965 9 Sheets-Sheet 2

Jan. 27, 1970 J. F. BENE ET AL 3,492,646

CROSS CORRELATION AND DECISION MAKING APPARATUS

Filed April 26, 1965 9 Sheets-Sheet 3

Jan. 27, 1970 J. F. BENE ET AL 3,492,646

CROSS CORRELATION AND DECISION MAKING APPARATUS

Filed April 26, 1965 9 Sheets-Sheet 5

3,492,646

CROSS CORRELATION AND DECISION MAKING APPARATUS

Jack F. Bene and Gerald A. Garry, Rochester, Minn., assignors to International Business Machines Corporation, Armonk, N.Y., a corporation of New York Filed Apr. 26, 1965, Ser. No. 450,647
Int. Cl. G06k 9/00
U.S. Cl. 340—146.3 13 Claims

ABSTRACT OF THE DISCLOSURE

Data correlation apparatus is provided which includes means for generating an unknown set of data in response to scanning a pattern or character on a document. Known sets of stored data are correlated with the unknown set of data and the identity of the known sets of data are stored in order positions according to the degree of correlation. A minimum tolerance value is introduced into the correlation process to develop a band of candidates for identifying the unknown data set. This provides at least two candidates for enabling a minimum distance check to be made and limits the number of references to be considered in the event re-correlation is required.

This invention broadly relates to data processing apparatus and more particularly relates to apparatus for automatically examining sets of unknown data and providing indications in coded form as to the identities of these sets of data.

This invention finds particular utility in pattern or character recognition machines where the unknown pattern or character is converted to a set of digital data signals. This unknown set of digital signals is then cross correlated with known sets of digital signals representing reference characters. The invention provides an economical approach for comparing the known reference patterns with the unknown pattern or character to enable recognition thereof with a very high degree of certainty. It should be realized that the problem of recognizing characters is complicated because there are many font styles for each character. Business documents especially are printed on typewriters and business machines having a multitude of type styles. Hence, there can be more than one reference pattern for each character.

Cross correlation is quite well known in the prior art of pattern recognition. The pattern to be identified is usually represented by a data set defined as the unknown data set. Known patterns used as references are represented by known data sets. An unknown data set is then compared with each known data set and this comparison can take place sequentially or in parallel. The pattern corresponding to the known data set which by comparison is most similar to the unknown data set is then considered as the identity of the unknown pattern. The prior art has developed to a point where the known data set most closely resembling the unknown data set must do so to a predetermined degree or it will not be considered as recognizing the unknown data set. The present invention goes beyond this and determines whether or not there are any conflicts in identity. It improves the certainty of identification of the unknown data set.

This is accomplished during the correlation process by developing candidates for identifying the unknown set of data. Only known sets of data which resemble the unknown set of data within a given correlation tolerance are accepted as candidates. The candidates are ordered to form a table or word in data storage during the correlation process according to the degree that they resemble the unknown data set. The best candidate in addition to being the candidate most closely resembling the unknown data set must be a predetermined degree better than the second best candidate or a conflict in identification is noted. This predetermined degree of difference in resemblance is considered a minimum distance criteria. For example, where the minimum distance criteria is three, if the best candidate is at least three order positions away from the second best candidate in the table of candidates, then the best candidate identifies the unknown data set with a very high degree of certainty. On the other hand, if the best and second best candidates are separated by less than three order positions, or if they occupy the same order position, and the candidates represent two different known sets of data in kind, then a conflict is noted. The minimum distance criteria of course can be varied or pre-set before obtaining each unknown data set, i.e., before scanning a character. Thus, from the immediate foregoing it is seen that the invention provides apparatus for developing and ordering candidates within a predetermined band width for identifying unknown sets of data and further provides criteria which requires that the best and second best candidate be separated by a predetermined number of order positions within the band width in order for the best candidate to qualify as identifying the unknown data set.

Other attractive features of the invention include the placing of the identity of the known set of data qualifying as a candidate in a table or word of candidates at an order position therein corresponding to the degree or level at which the candidate qualified. This has great utility. For example, in multifont character recognition machines, where it is desired to use different known sets of data having the same identity for identifying the unknown data set, several different known sets of data may be used to identify a Z with possible font variations. However, the identity of one known set of data identifying the character Z according to one font is exactly the same as the identity of the known data set identifying the unknown character Z according to another font. Hence, if there are two identical identities within the minimum distance criteria, a conflict will not be noted.

To further enhance the invention, correlation takes place in a converging manner. In a preferred embodiment of the invention, the unknown and known data sets are in digital form. Hence, during the correlation process, the degree to which the known data set resembles the unknown data set can be expressed in a digital number. Further, this number can be used to indicate how well or how poorly the known data set matches the unknown data set. Accordingly, the degreee of resemblance can be expressed in the number of mismatches between the known and unknown data sets. During the correlation process an initial value is set as a correlation cut off value. This initial value is used to determine if the comparison process between known and unknown sets of data should continue to completion. If the number of mismatches exceeds the correlation cutoff value prior to completion of the comparison between any known and unknown sets of data, the comparison operation for that particular known set of data is immediately halted and the unknown set of data is then compared against another known set of data. However, if during the comparison operation, the number of mismatches does not exceed the correlation cut off value, then that known set of data is a candidate for identifying the unknown set of data, and the identity of the candidate is stored in an order position of a table or word of positions in data storage corresponding to the total number of mismatches occurring during the comparison between that particular known and unknown sets of data. After a first candidate is determined, the correlation tolerance value is added to the number of mismatches resulting from the comparison of that candidate with the unknown data set and the sum becomes a new correlation cut off value. Thus, there is a new correlation cut off value after each new candidate. It is readily seen that the discontinuance of the comparison operation, because the correlation cut off value has been exceeded, and the substitution of a new correlation cut off value every time there is a new candidate causes rapid convergence toward the identity of the known data set best matching the unknown data set.

To further improve the convergence an "additive constant value" is associated with each known set of data and functions to normalize the number of mismatches. This is better understood by accepting the fact that there are higher numbers of mismatches for some unknown data sets than there are for others. For example, when the unknown data set represents the character M, the total number of mismatches corresponding to the identifying candidate for the M will be greater than the total number of mismatches corresponding to the candidate for identifying the character I. Therefore, the additive constant value associated with the known set of data is added to the number of mismatches developed during the comparison of said known set of data with the unknown set of data. In fact, the additive constant value is entered into the device for accumulating the number of mismatches prior to the comparison between the known and unknown sets of data.

Accordingly, a principle object of this invention is to provide improved cross correlating apparatus for identifying unknown data sets with a very high degree of certainty.

Another very important object of the invention is to provide cross correlating apparatus which develops at least two candidates for identifying the unknown data set.

A further very important object of the invention is to provide cross-correlating apparatus where only the identities of known sets of data which resemble the unknown set of data within a given correlation tolerance are accepted as candidates for identifying the unknown set of data.

Still another very important object of the invention is to provide cross correlation apparatus where the candidates for identifying the unknown set of data are ordered to form a table during the correlation process according to the degree that they resemble the unknown set of data.

Yet a further very important object of the invention is to provide cross correlation apparatus where the best candidate must be a predetermined degree better than the second best candidate or a conflict in identification is noted.

Still another object of the invention is to provide cross correlation apparatus which utilizes a correlation cut off value.

A more specific object of the invention is to provide cross correlation apparatus including a variable correlation cut off value which is varied each time a known set of data is accepted as a candidate for identifying the unknown set of data.

Yet a still further object of the invention is to provide cross correlating apparatus which identifies the known sets of data used in the correlation process with codes.

A more specific object of the invention is to provide cross correlating apparatus which examines the identification codes corresponding to the candidates to detect any conflicts between known data sets which qualify to identify the unknown data set and thereby permit the detection of conflicting identifications of the unknown data set.

Another specific and very important object of the invention is to provide cross correlation apparatus which enables more than one correlation between the known data sets and the unknown data set if the known data set best identifying the unknown data set is not separated from the second best identifying known data set by a predetermined degree of separation.

Still a further specific object of the invention is to provide cross correlation apparatus which generates a reject control signal for line marking apparatus, if after a predetermined number of re-correlations, the best and second best identifying known data sets are not separated by a predetermined minimum distance value.

Another rather specific object of the invention is to provide cross correlation apparatus which normalizes the known data sets.

Still another specific object of the invention is to provide cross correlation apparatus which has data storage for known sets of data and each known set of data includes data for locating another known set of data in storage.

Another object of the invention is to provide cross correlating apparatus for correlating an unknown data set with a large number of known reference data sets which is relatively inexpensive.

A further object of the invention is to provide cross correlating apparatus which operates at relatively high speed.

The foregoing and other objects, features and advantages of the invention will be apparent from the following more particular description of a preferred embodiment of the invention as illustrated in the accompanying drawings.

In the drawings:

FIG. 1 is a schematic block diagram of the invention;

FIGS. 2*a*, 2*b*, 2*c*, and 2*d* arranged as in FIG. 3 constitute a logic circuit diagram of the invention;

FIG. 3 shows the arrangement for FIGS. 2*a*, 2*b*, 2*c* and 2*d*;

FIGS. 4*a* and 4*b* are detailed logic circuit digrams of the correlation and decode apparatus;

GENERAL DESCRIPTION

Figure 1:
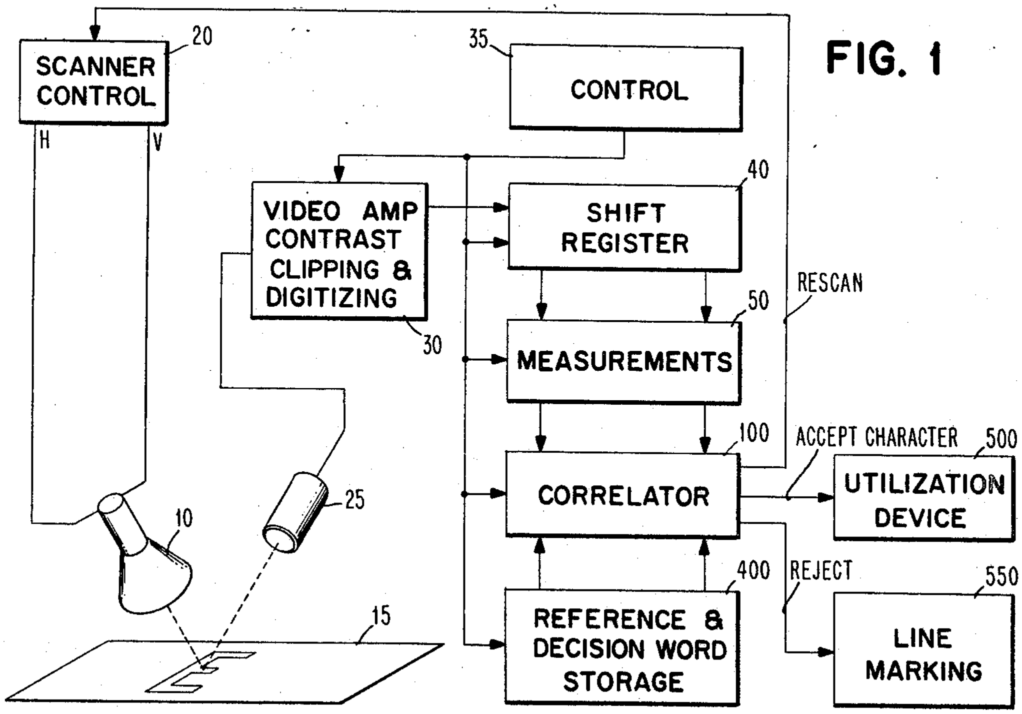

With reference to the drawings and particularly to FIG. 1, the invention is shown by way of example as being incorporated into a character recognition machine which includes a conventional cathode ray tube 10 for scanning characters on document 15. The document 15 is stationary while being read. The movement of the beam of the cathode ray tube 10 is controlled by scanner cotrol apparatus 20. The use of a cathode ray tube or flying spot scanner in character recognition machines is quite well known and therefore, will not be particularly elaborated upon. Briefly, the characters on document 15 are scanned by moving the beam in a series of horizontally displaced vertically adjacent scans. In this example, the characters are scanned with approximately twenty vertical scans, starting at the right hand side and proceeding to the left from the bottom to the top of a character. After one vertical scan of the character, the beam flies back angularly downward to the left as it is deflected both horizontally and vertically and then makes another vertical scan from the bottom to the top. This action repeats until the character is completely scanned by twenty vertical scans.

As the characters are scanned, the cathode ray tube beam is reflected from document 15 to photomultiplier tube 25. The amount of light reflected from a character is generally substantially less than that reflected from the background area of document 15. Photomultiplier tube 25 is actviated by the reflected light and essentially develops a signal at one level due to the light reflected by a character and develops a signal at another level from the light reflected by the background area. These signals are both analog in amplitude and time, and are termed the video signal. The video signal is then amplified and digitized in both amplitude and time by circuitry 30 which includes video amplifying contrast clipping and digitizing circuits which are all of the type well known in the art. In this particular example, the analog signal developed as a result of each vertical scan is digitized into 32 increments. The amount of time for flyback equals seven increments. The amplitude of the signal at each of the 32 increments will be at one of two levels depending upon the optical condition at the particular time of scanning. If a certain amount of a portion of a character is engaged by the beam during one of the 32 increments of a vertical scan, then the optical condition is said to be black and the signal amplitude will be at a "one" level. If none or only a very small part of a portion of a character is engaged, the optical condition is considered white and the signal amplitude will be at a "zero" level. These designations are arbitrary and could be reversed without affecting the scope of the invention. The clipping and contrast circuit 30 determines if the optical condition for a particular segment is black or white. The segments of a vertical scan and flyback are determined by control circuit 35 which provides the proper timing signals.

Summarizing at this time, it is seen that the shape of the unknown character is transformed into a set of digital signals. These digital signals could form the unknown data set; however, in this particular example, these digital signals will first be stored and then examined by measurement logic and the resulting signals from the measurement logic become the unknown set of data. While it is not necessary to the purpose of this invention to perform this intermediate step, the use of measurement logic permits more font variations to be identified by a lesser number of known data sets or references.

Thus in this particular example, the digitized video data from circuit 30 is entered into shift register 40 under control of control circuit 35. The shift register 40 is sufficiently large to enable measurements 50 to examine the digitized data therein. In other words, shift register 40 must have a sufficient number of positions to permit measurements 50 to examine simultaneously different bits of data. In this particular example, the measurements 50 consist of 96 logic blocks of the type shown and described in co-pending application Ser. No. 227,322, now Patent No. 3,196,399 filed Oct. 1, 1962, for Specimen Identification Methods and Apparatus by L. A. Kamentsky et al. In the referenced application, the measurement called N-Tuples are logical AND circuits. These logical AND circuits each have seven inputs connected to differend positions of the shift register. The outputs of the logical AND circuits are connected to the set inputs of latches. This same arrangement is incorporated into the present invention and is illustrated by the block 50. Once any one measurement or logical AND circuit is satisfied, the associated latch is set. However, if the associated logical AND circuit is not satisfied, after all the bits of digital data have been entered into shift register 40, then the associated latch remains in the reset or zero condition.

Upon completion of the scanning of a character the conditions of the latches of measurements 50 which represent the unknown data set are cross correlated by correlator 100 with known data sets or reference words taken from data storage 400. The known or reference sets of data have as many bit positions as there are latches contained in measurements 50, i.e., 96 bit positions. These bit positions are either at a one or zero state and are arbitrarily called "ideal" bits. It has been ascertained that it is not always necessary to have a one for one correspondence between the bits of the unknown data set and the bits of the ideal known data set. Hence, each reference set of known data includes a second set of 96 bit positions which are also either a one or zero and are arbitrarily called "defining" bits. This second set of 96 bits is used to indicate if a corresponding bit position of the first set is to be considered as other than a "don't care" situation in the correlation process. If a bit position of the second set is a one, then it is immaterial whether the associated bit position of the first set cross correlates with the bit condition of the corresponding latch in measurements 50. On the other hand, if this bit of the second set is a zero, then the bit condition or state of the bit position of the first set must be identical to the bit condition of the corresponding latch in measurements 50. Otherwise, a mismatch will occur. The total number of mismatches between the bit positions of the first set of reference bits and the bit conditions of the latches of measurement 50 is indicative of how well or how poorly the known reference set of data matches the unknown data set. For example, if the total number of mismatches is very large, then the reference set of data matches the unknown data set very poorly. A low total number of mismatches is indicative of a good match between the unknown data set and a particular reference data set.

The correlator 100 as will be explained in connection with the description of FIG. 2 includes a correlation cut off value. The number of mismatches developed while comparing any one set of known reference data with the unknown set of data must not exceed the correlation cut off value or the correlation process will be discontinued with respect to that particular set of reference data and the identity of that particular set of reference data will not be entered into the decision word contained in storage 400. In other words, the reference set of data will not become a candidate for identifying the unknown set of data or the character scanned on document 15. If the number of mismatches developed while correlating a reference set of data with the unknown set of data, does not exceed the correlation cut off value, the identity of the reference set of data is entered into the decision word in an order position therein corresponding to the number of mismatches. Additionally, after developing a first candidate, a correlation tolerance value is added to the number of mismatches for that qualifying reference data set and the sum of these two numbers becomes the new correlation cut off value. By introducing the correlation tolerance value into the newly formed correlation cut off value, it is possible to develop a band of candidates for identifying the unknown data set. Further by developing a band of candidates for identifying the unknown data set, it is possible to examine the relative positions of the candidates within the decision word to determine whether or not the best qualifying candidate has correlated with the unknown data set with a very high degree of certainty. Another advantage of developing this band of candidates is that if it is necessary to perform some recovery operation in order to identify the unknown data set with greater certainty, it is only necessary to work with reference sets of known data relating to the identities provided by the candidates within the band.

The correlation process continues until all reference sets of known data are compared with the unknown set of data. Thereafter, the decision word in storage 400 is examined from low order to high order, in this particular example. The first encountered order position containing the identity of the reference set of data is considered the identity of the unknown set of data provided that the next occupied position in the decision word is outside of the minimum distance criteria. To illustrate this, consider that the decision word contains 16 order positions. Further consider that the best candidate is in order position number 3. Then, if the minimum distance criteria is 2, a next best candidate must be in order position 6 or higher. If this occurs, then the identity of the best candidate is transmitted in coded form to utilization device 500. However, if the best and second best candidates are not separated from each other in the decision word, by an amount greater than the minimum distance criteria, a conflict is noted. The existence of a conflict causes a re-scan operation and there are recovery procedures available such as changing threshold levels in circuit 30 and using different known sets of data having the some identities as those for the qualifying candidates so as to attempt to improve the separation between the best and second best qualifying candidate. If, after a predetermined number of re-scans, the character or unknown data set cannot be positively identified, then a reject signal is generated. This signal can be used for many things, such as activating a marking device 550 for marking the line of printing containing the unrecognized character, or for actuating a stacker mechanism, not shown, for segregating the document containing the unrecognizable character from those docements where all the characters have been recognized.

From the foregoing, it is seen that the correlation process takes place in such a manner that a band of candidates is developed for identifying the unknown data set. Further, the identities of the candidates are entered into a decision word in storage 400 and a test is made to determine whether the best identifying candidate identifies the unknown data set a predetermined degree better than the degree to which the second best candidate identifies the unknown data set. Hence, either the best candidate results in a positive identification of the unknown data set or a conflict is stated to exist and re-scan procedures are instituted. If, after a predetermined number of re-scans, the conflict still exists, it is concluded that the character or unknown data set, cannot be identified and a reject signal is generated. The detailed description as to how the digitized data is entered into shift register 40, how the correlator 100 operates in a converging correlation cut off manner, how candidates are entered into the decision word, and how the best candidate is identified and tested to see whether or not it meets the minimum distance criteria follows.

DETAILED DESCRIPTION

The unknown data set

With reference to FIG. 2, the unknown data set is developed by scanning the characters on document 15. The beam of the cathode ray tube 10 is directed by scanner control 20 to scan the characters in a series of horizontally adjacent vertical scans. Photomultiplier tube 25 collects light reflected from document 15 and develops an output signal which is analog in amplitude and time. This video signal is then amplified and digitized by circuit 30 and entered into shift register 40 via logical AND circuit 36. Logical AND circuit 36 is conditioned by a signal from control 35. The digitized bits of data are thus entered into shift register 40 in the sequence in which the characters are scanned. In this particular example, shift register 40 has approximately 500 positions and the data is entered therein serially. A shift register which is quite satisfactory for this purpose is shown and described in IBM Technical Disclosure Bulletin, Vol. 7, No. 7, on page 600, dated December 1964.

The data entered into shift register 40 is examined by measurements 50 which are of the type shown and described in the aforementioned Kamentsky et al. application. Although they are not shown, it should be noted that the measurements 50 include 96 logical AND circuits which have their outputs connected to the set inputs of 96 latches. These latches are initially reset from a pulse passed by delay 38. Delay 38 receives a pulse from singleshot multivibrator 37 which in turn is fired from asignal from control 35. The 96 measurements function to determine the existence or non-existence of particluar features in the character scanned.

After a character has been completely scanned, all of the digitized data will have been entered into shift register 40. Consequently, the logical AND circuits of measurements 50 will have had an opportunity to examine all of the data entered into shift register 40. If at any time any one of the logical AND circuits is satisfied, the associated latch is set. Therefore, after all the data has been entered into shift register 40, the conditions of the associated latches in measurements 50 will represent the unknown data set.

In order to permit correlation to take place on one measurement set of unknown data, while another character is being scanned, the first unknown set of data as represented by the latches of measurements 50 is transferred to measurement register 55 via logical AND circuits 51. Logical AND circuits 51 are conditioned from a signal from singleshot multivibrator 37. Of course, the bipolar outputs of the latches of measurements 50 are connected to inputs of logical AND circuits 51 which in turn have their outputs connected to inputs of register 55. Register 55 is made up of latches or other suitable bistable devices. It is thus seen that the information in the latches of measurements 50 is transferred to measurement register 55 as singleshot multivibrator 37 produces a pulse. This pulse is then delayed by delay 38 and the output pulse from delay 38 is used to reset the latches in measurements 50. With the unknown set of data in register 55, correlation of this data with known sets of data in storage 400 can take place.

Cross correlation

*Initialization.*—At some time prior to the first correlation operation, such as at the time of starting up the machine, predetermined values are entered into the first reference register 101, the decision word register 102, the initial correlation value register 103, and the minimum distance tolerance and criteria registers 104 and 105, respectively. These registers are shown in block form because they can take many different forms without affecting the scope of the invention. These registers could be latch-type registers, and the latches would be set by data coming from a computer or other control unit or the latches could be set by manually operated switches. Although the structure of these registers is not particularly important, the function thereof is significant.

Figure 7:
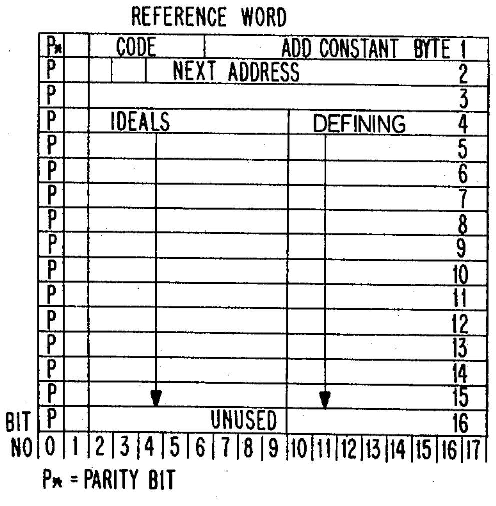
FIG. 7 is a diagram of a typical reference word.

The first reference register 101 in this example is a nine position binary register which is set to contain the word address of the first reference word in data storage 400. There are 512 words contained in data storage. Each reference word as seen in FIG. 7 consists of 16 bytes and each byte is divided into 18 bits. Data storage 400 is a conventional magnetic data storage device and is addressed by an address register 410 consisting of word address and byte address sections. The word address of the first reference word in data storage is not directly transferred from first reference register 101 to the address register 410, but rather is transferred to a next address register 106 via logical AND circuits 107 and logical OR circuits 108. The details of the transfer of data from registers 101 and 106 will be described later herein.

Again referring to FIG. 7, it is seen that the identity of the reference word is contained in byte 1 and the address for the next reference word to be used in the correlation process is contained in byte 2. It should be further noted that each of the bytes 4 through 15 contain 8 bits of Ideal data and 8 bits of Defining data. Hence, the correlation process for correlating the data in measurement register 55 with data in a reference word, takes place in 12 steps during byte 4 and 15 times inclusive in this particular example. Obviously, if the number of bits in a byte were increased, then the number of steps could be reduced. It should also be noted that the first reference word contains the address for the second reference word and the second reference word contains the address for the third reference word, etc. The last reference word has an indication in the second bit position of byte 2 designating or identifying it as the last reference word.

The number of words within data storage 400 is governed by the number of references required for the correlation process. For example, if the charatcer recognition machine is constituted only to recognize characters from one font style, then data storage 400 will contain single font references for each character in the character set. Conversely, if the character recognition machine is required to recognize characters of many different fonts, then data storage 400 will contain either references for each possible font or general font references and single font references which would be called into the correlation process if the character could not be recognized when using the general font references.

Figure 8:
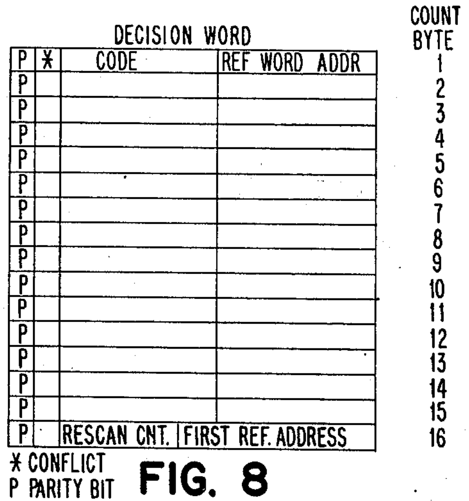
FIG. 8 is a diagram of a decision word.
Figures 2A, 3:
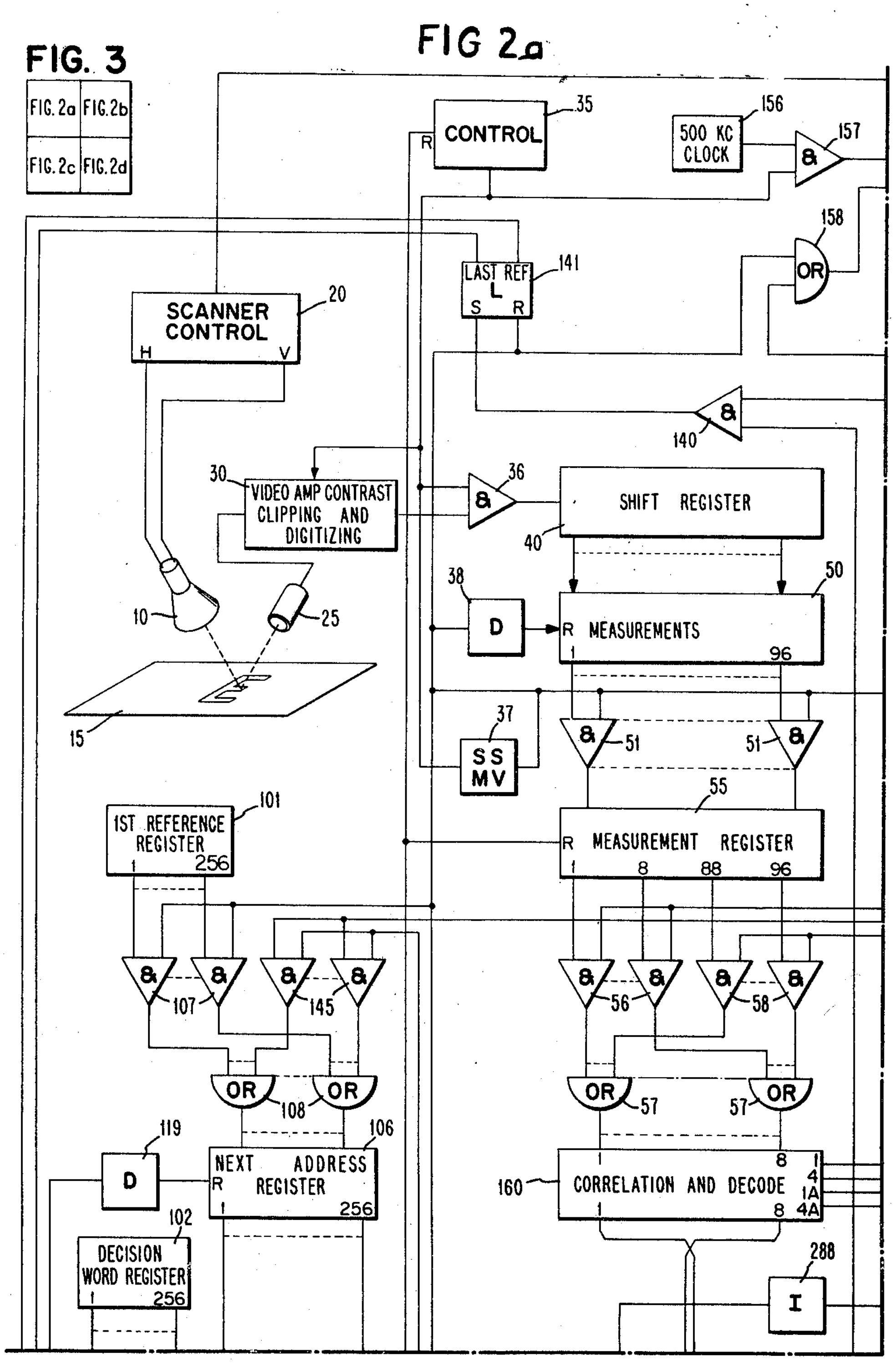
Figure 2B:
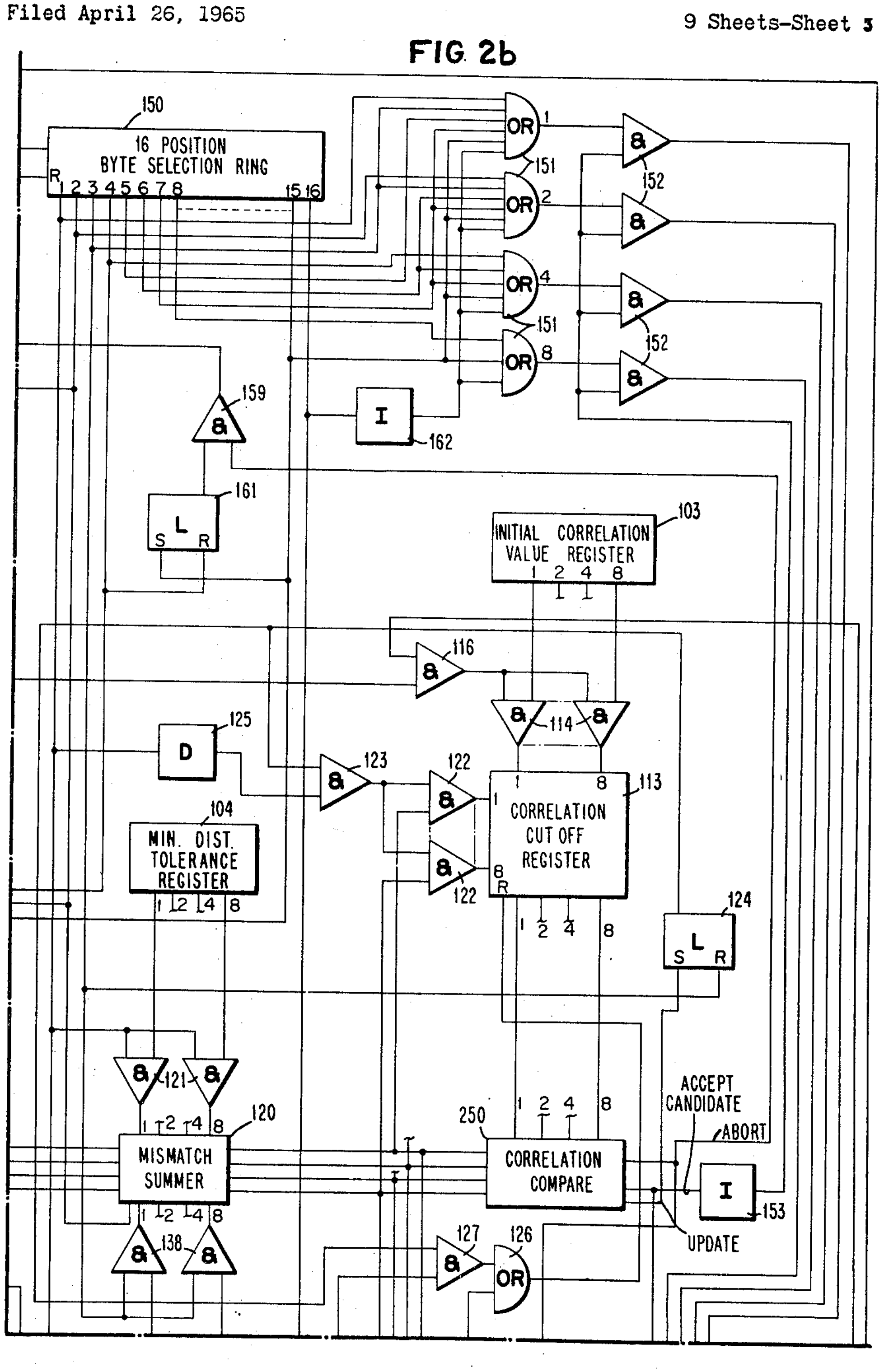
Figure 2C:
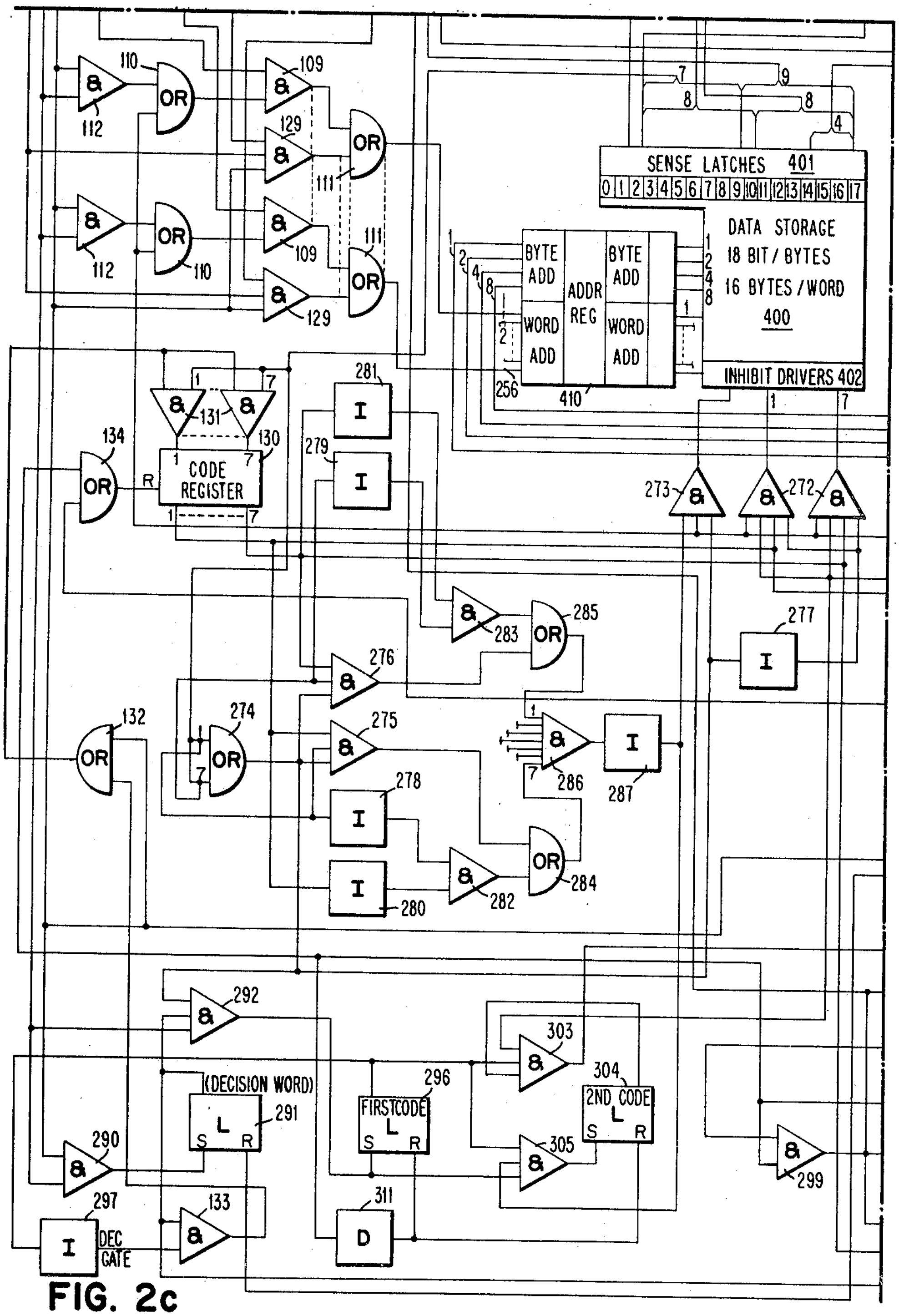
Figure 2D:
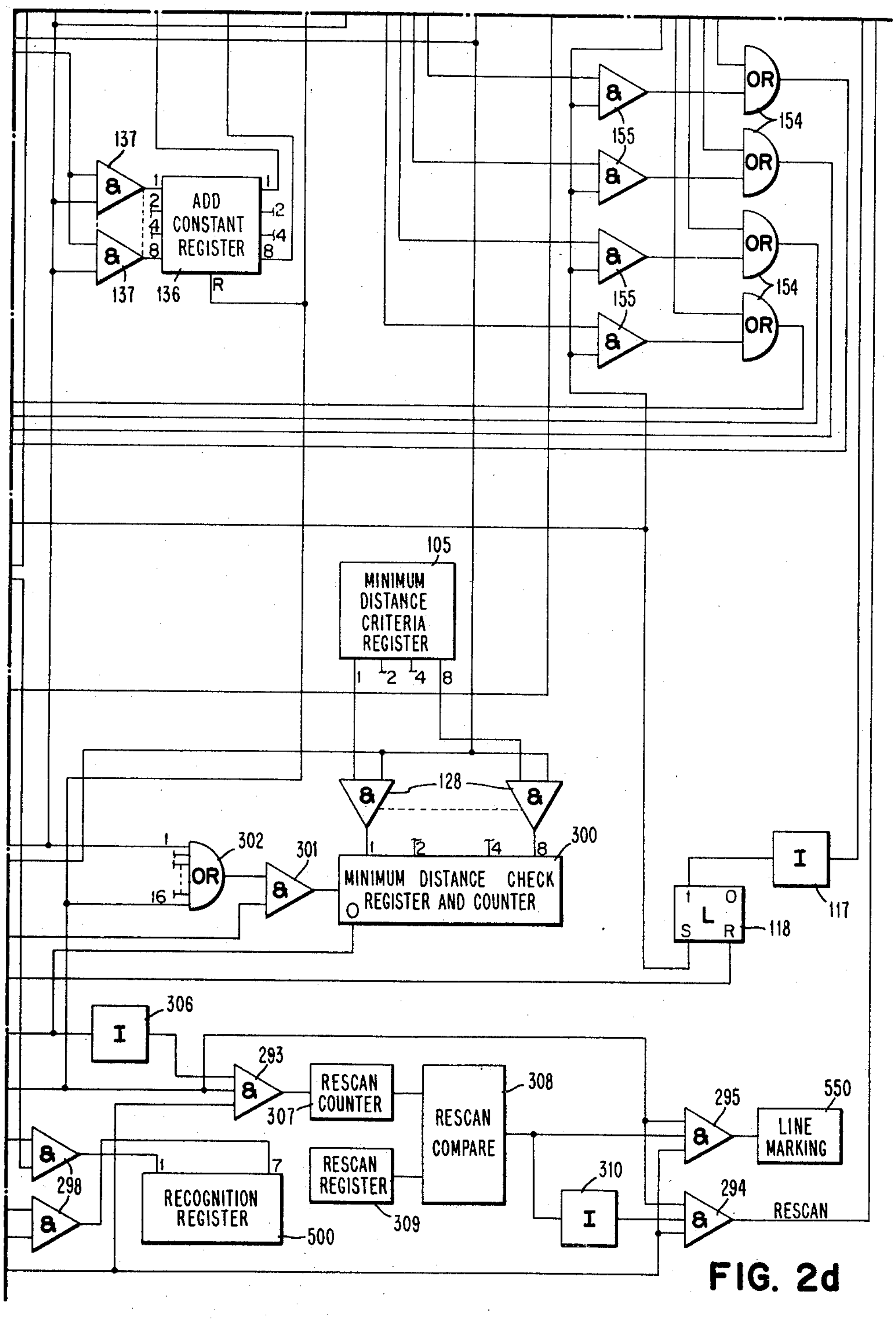

The decision word register 102 is also a nine position register and its make up can be very similar to and loaded in the same manner as the first reference register 101. The decision word register 102 contains the address of a decision word in storage 400. The format of the decision word is shown in FIG. 8 and it consists of 16 bytes with 18 bits in each byte. The decision word is reserved in storage for storing the codes and addresses of the reference words which possibly identify the unknown character during the correlation process. In other words, it contains the candidates for identifying the unknown character. Consequently, the decision word must be addressed during the correlation process each time that a reference word results in a number of mismatches which is less than the particular correlation cut off value in the correlation cut off register. Also, during the correlation process the decision word will be addressed after all reference words have been cross correlated in order to determine which reference is most similar to the unknown character.

The outputs of the decision word register 102 are connected to inputs of logical AND circuits 109 which have inputs also connected to outputs of logical OR circuits 110. The signals passed by logical OR circuits 110 will condition logical AND circuits 109 to pass the contents of the decision word register 102 to the word address portion of the address register 410 via logical OR circuits 111. In order to address the decision word whenever a reference word qualifies as a candidate for identifying the unknown character, the Accept Candidate output of the correlation compare circuit 250 is connected as an input to logical OR circuits 110. Additionally, to facilitate interrogation of the decision word after all reference words have been cross correlated, the set output of the last reference latch is connected to inputs of logical AND circuits 112 which have their outputs connected to inputs of logical OR circuits 110. The logical AND circuits 112 also have an input connected to position 1 of the selection ring.

The initial correlation cut off value is set in the initial correlation value register 103. The initial correlation value register 103 is a four position binary register which can be constructed of latches and set in the same manner as the decision word register 102. It will be recalled that correlation of data within a reference word with the data in the measurement register takes place in twelve steps because only eight bits of data are correlated at one time and it is required to correlate 96 bits of data. Further, it was pointed out that the number of steps could be varied by changing the byte size and the number of bytes per reference word, without affecting the scope of the invention. However, an important thing to note is that irrespective of the number of steps used in the correlation process, each embodiment would have the common feature of terminating the correlation process if the number of mismatches between the measurements in the measurement register 55 and the data within a reference word exceeds the correlation cut off value.

The contents of the initial correlation value register 103 are transferred to the correlation cut off register 113 under control of logical AND circuits 114. Logical AND circuits 114 have inputs connected to the outputs of the initial correlation value register 103 and inputs connected to the output of a logical AND circuit 116. The outputs of the logical AND circuits 114 are connected to inputs of the correlation cut off register 113. The logical AND circuit 116 has an input connected to the output of the singleshot multivibrator 37 and an input connected to the output of an inverter 117. Inverter 117 has its input connected to the set output of a latch 118. The latch 118 is in the reset condition except when set by an Accept Candidate signal from the correlation compare circuit 250. Hence, if the latch 118 is in the reset condition, the logical AND circuit 116 will be conditioned to pass the signal from singleshot multivibrator 37 and the logical AND circuits 114 will be conditioned to pass the initial correlation value to the correlation cut off register 113. By this arrangement, the initial correlation value can be entered into the correlation cut off register 113 prior to starting the correlation process. It should be realized that the correlation cut off register 113 could be initially set with a predetermined value in many other ways, such as being reset to a predetermined value by means of the signal developed by the singleshot multivibrator 37. It should also be noted at this time that the value in the correlation cut off register 113 can be changed during the correlation process by a value contained in the mismatch summer 120. The particular way in which this is done will be desribed later herein.

The minimum distance tolerance register 104 is a four position binary register which can be constructed and set with a value similar to the first reference register 104. The value in the minimum distance tolerance register 104 is to be entered into the mismatch summer 120 so as to be combined with the total number of mismatches therein and the combined value is entered into the correlation cut off register 113 if there is an Accept Candidate signal from the correlation compare circuit 250. By this arrangement, the minimum distance tolerance value functions to define a band width for the candidates to qualify for entry within the decision word contained in storage 400.

The outputs from the minimum distance tolerance register 104 are connected to inputs of logical AND circuits 121 which have their output connected to inputs of the mismatch summer 120. The logical AND circuits 121 are conditioned by a signal coming from position 1 of the selection ring 150. Hence, at selection ring 1 time the minimum distance tolerance value is entered into the mismatch summer 120 to be combined with the value therein, if any, and this combined value is the new correlation cut off value which is to be entered into the correlation cut off register 113 if the correlation cut off value is to be updated. If updating is to take place as described later herein, it takes place during selection ring 1 time delayed. The mismatch summer 120 is subsequently reset at selection ring 2 time.

Assuming that the correlation value is to be updated, the new correlation cut off value in the mismatch summer 120 which consists of the total number of mismatches which occurred in connection with correlating the acceptable reference candidate with the unknown data set plus the minimum distance tolerance value is transferred to the correlation cut off register 113 via logical AND circuits 122. The logical AND circuits 122 are conditioned by a signal coming from logical AND circuit 123. The logical AND circuit 123 has one input connected to the set output of a latch 124 and an input connected to the output of a delay 125 which has its input connected to position 1 of the selection ring 150. The latch 124 is set by an Update signal from the correlation compare circuit 250 and reset by a signal from position 3 of the selection ring. Hence, latch 124 provides an indication that updating is to take place and by means of delay 125 updating does take place at selection ring 1 time delayed. It should also be noted that the correlation cut off register 113 is reset initially by a signal coming from control 35 via singleshot multivibrator 37 and the logical OR circuit 126. It can also be reset by a signal passed by logical AND circuit 127 which has an input connected to the set output of the latch 124 and an input connected to position 1 of the selection ring 150.

The minimum distance criteria register 105 is a four position binary register for containing the value used to establish whether or not there is a conflict in identification between the best candidate and the second best candidate. The outputs from the minimum distance criteria register 105 are connected to inputs of logical AND circuits 128 which have their outputs connected to inputs of the minimum distance check register and counter 30. The logical AND circuits 128 are conditioned by a signal coming from the singleshot multivibrator 37.

It should be noted that the first reference register 101, the decision word register 102, the initial correlation value register 103 and the minimum distance tolerance and criteria registers 104 and 105 could all be loaded with data coming from data storage 400. The particular way that this would be done would be very similar to the manner in which the code register 130 and the additive constant register 136 receive data from data storage 400.

Each reference word, FIG. 7, contains coded information for identifying the reference and an additive constant value which functions to normalize the number of mismatches for the particular reference word. It is seen that byte 1 of a typical reference word contains bit positions for a code which identifies the reference and bit positions for an additive constant value. The particular code used to identify the reference word is in an automated business machine or computer code. In this particular example, the reference words are represented by the well-known seven bit modified binary decimal code. This code is transferred from the reference word in data storage at byte 1 time to the code register 130 via sense latches 401 and logical AND circuits 131. The logical AND circuits 131 have inputs connected to seven outputs of the sense latches 401 and inputs connected to the output of a logical OR circuit 132 which provides a signal for conditioning the logical AND circuits 131 to pass the information from data storage 400 to the code register 130.

The code register 130 may contain data entered from either a reference word or a decision word and consequently the logical OR circuit 132 has an input connected to position 1 of the selection ring and an input connected to the output of a logical AND circuit 133. The inputs to the logical AND circuit 133 will be described later herein but suffice it to say at this time that the logical AND circuit 133 provides a gating signal at the time the decision word is interrogated or scanned for the code representing the best candidate. The outputs of the logical AND circuits 131 are connected to inputs of the code register 130. The code register 130 is reset from a signal passed via logical OR circuit 134 which has one input connected to position 16 of the selection ring 150 and another input connected to the Abort output of the correlation compare circuit 250. The signal passed by the logical OR circuit from position 16 of the selection ring functions to reset the code register 130 at the end of a successful correlation, whereas the Abort signal provided by the correlation compare circuit resets the code register 130 when the correlation process is terminated prior to selection ring 16 time.

The additive constant values in byte 1 of the reference words in storage are transferred to the additive constant register 136 via logical AND circuits 137 which, in addition to inputs from the sense latches 401, have a conditioning input connected to position 1 of the selection ring. The outputs from the additive constant register 136 are connected as inputs to logical AND circuits 138. The logical AND circuits 138 also have a conditioning input connected to position 3 of the selection ring and their outputs are connected to inputs of the mismatch summer 120. Thus, it is seen that the additive constant value stored in four bit positions of byte 1 of the reference words is transferred to the additive constant register 136 at selection ring 1 time. The additive constant value in the additive constant register 136 is then subsequently transferred at selection ring 3 time to the mismatch summer 120 under control of the logical AND circuits 138. The additive costant value is entered into the mismatch summer 120 at such a time so as not to interfere with the updating of the correlation cut off value and yet to be available for the correlation process. Therefore, since the minimum distance tolerance value is entered into the mismatch summer 120 at selection ring 1 time and the mismatch summer 120 is reset at every selection ring 2 time, the additive constant value is entered into the mismatch summer at selection ring 3 time and will remain in the mismatch summer 120 during the correlation process for the particular reference word which contained that additive constant value. The additive constant register 136 has its reset terminal connected to position 16 of the selection ring.

From the immediate foregoing it is seen that prior to the correlation process of comparing the unknown data set in the measurement register 55 with reference words from data storage 400, which constitute the known data sets, the location of the first reference word is set into the next address register 106. The initial correlation value is also at this time set into the correlation cut off register 113. The last reference latch 141 is reset at this time, and the minimum distance criteria value is transferred to the minimum distance check register and counter 300. Thereafter, several events take place simultaneously at selection ring 1 time. The address of the first reference word in the next address register 106 is transferred via logical AND circuits 129 and logical OR circuits 111 to the word address portion of the address register 410 and the code of the addressed reference word is transferred into the code register 130. Also, the additive constant value is transferred to the additive constant register 136. The minimum distance tolerance is entered into the mismatch summer 120. At selection ring 1 time delayed, the next address register 106 is reset by a signal from delay 119 and if appropriate, as previously indicated, the new correlation cut off value in the mismatch summer 120 is passed to the correlation cut off register 113 to update the value therein.

At selection ring 2 time, the address for the next reference word to be used in the correlation process is transferred from byte position 2 of the present reference word under consideration via logical AND circuits 145 and logical OR circuits 108 to the next address register 106 which had been reset at selection ring 1 time delayed. Further, the mismatch summer 120 is reset at selection ring 2 time. It may also be noted that at selection ring 2 time, if the reference word under consideration happened to be the last reference word, then logical AND circuit 140 would pass a signal for setting the last reference latch 141 at selection ring 2 time.

At selection ring 3 time, the additive constant value in the additive constant register 136 is transferred to the mismatch summer 120. Also, the update latch 124 is reset at selection ring 3 time. It may be noted that in this particular example, byte position 3 of the reference word does not contain any data.

The comparison of data in the measurement register 55 with data in the reference word takes place during selection ring 4 to 15 times inclusive. This comparison is accomplished by means of the correlation and decode circuit 160. However, before describing the correlation and decode operation, brief mention will be made of data storage 400, the address register 410 and the selection ring 150.

Data storage, address register, and selection ring

Data storage 400 can be any binary storage device and in this example consists of magnetic cores arranged to form a plurality of words with sixteen bytes in each word. Each byte consists of eighteen bits. Sense windings threading the cores in the usual manner are connected to eighteen sense latches 401. Hence, upon the read out of data the sense latches 401 are set. The read out is destructive and if the same data read out is to be preserved in storage, it is written therein from the sense latches 401 via the inhibit drivers 402.

Each word in storage is addressed by the word address by the word address portion of the address register 410. The word address portion of the register 410 receives data from either the decision word register 102 or the next address register 106. The word address, in this example, can address 512 words in storage. The bytes of each word are addressed by means of data contained in the byte address portion of the address register 410. The byte address portion of the address register 410, receives its data either from the selection ring 150 or from the mismatch summer 120.

Since the byte address portion of the address register 410 is in the four bit binary code and the selection ring 150 has sixteen discrete outputs, it is necessary to convert these outputs to four binary outputs. This is accomplished by means of logical OR circuits 151 which have inputs connected to the various outputs of the selection ring 150. The outputs of the four logical OR circuits 150 are connected to inputs of four logical AND circuits 152 which each have a conditioning input connected to the output of an inverter 153. The inverter 153 has its input connected to the accept candidate output of the correlation compare circuit 250. The reason for controlling the outputs from the four logical OR circuits 151 by means of the four logical AND circuits 152 is to permit addressing of a byte position of a decision word in storage 400 by means of a value contained in the mismatch summer 120. Consequently, the outputs of the four logical AND circuits 152 are connected to inputs of four logical OR circuits 154, the same having their outputs connected to the binary inputs of the byte address portion of the address register 410. The four logical OR circuits 154 also have inputs connected to outputs of four logical AND circuits 155 which have inputs connected to the four binary outputs from the mismatch summer 120. The four logical AND circuits 155 also have a conditioning input connected to the Accept candidate output of the correlation compare circuit 250. Thus it is seen that the bye position ring 150 or by the mismatch summer 120. The selection ring 150 addresses bytes within reference words and addresses bytes within the decision word when it is to be scanned to determine the identity of the best candidate. The mismatch summer 120 only addresses bytes within a decision word and at the time a candidate is to be entered therein.

The selection ring 150 is a sixteen position ring which is advanced from signals coming from a 500 kc. clock 156. The signals from the clock 156 are gated by means of a logical AND circuit 157 which is conditioned by a signal coming from control 35. The selection ring 150 can be reset by a signal coming from the singleshot multivibrator 37 and passed by logical OR circuit 158 or by an Abort signal coming from correlation compare circuit 120 which is passed via logical AND circuit 159 to the logical OR circuit 158. The logical AND circuit 159 is conditioned by an output signal coming from the reset output of a latch 161 which has its set terminal connected to position 15 of the selection ring 150 and its reset terminal connected to position 4 of that ring. By this latter arrangement, the selection ring 150 can never be reset by an Abort signal from sixteen time to four time which time is utilized to perform operations to facilitate correlation during four to fifteen time. Position 16 of the selection ring 150 is connected to the input of inverter 162 which has its output connected to inputs of logical OR circuits 151 to thus avoid addressing a word at byte 16 by the selection ring 150.

Correlation and decode

Figure 4A:
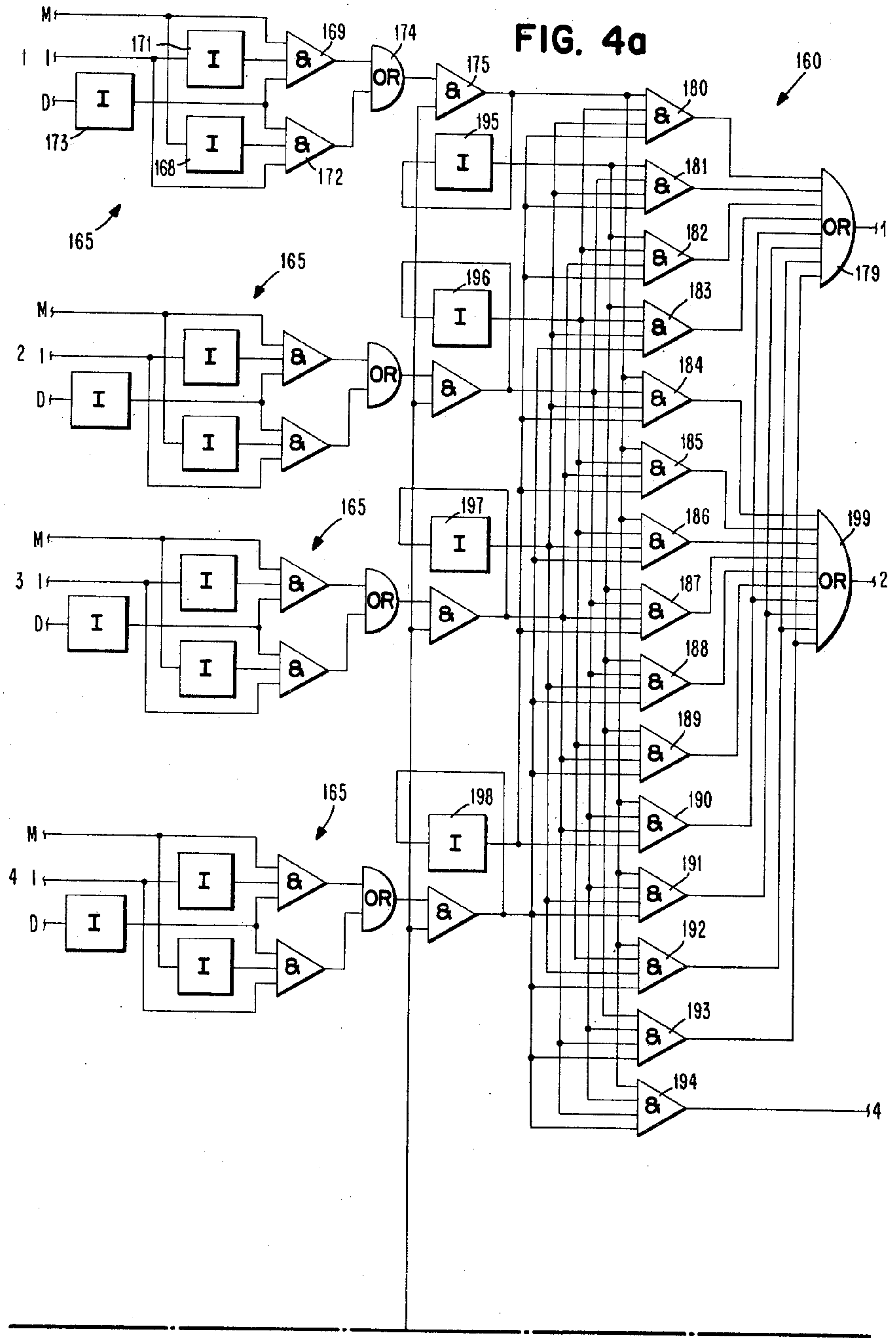
Figure 4B:
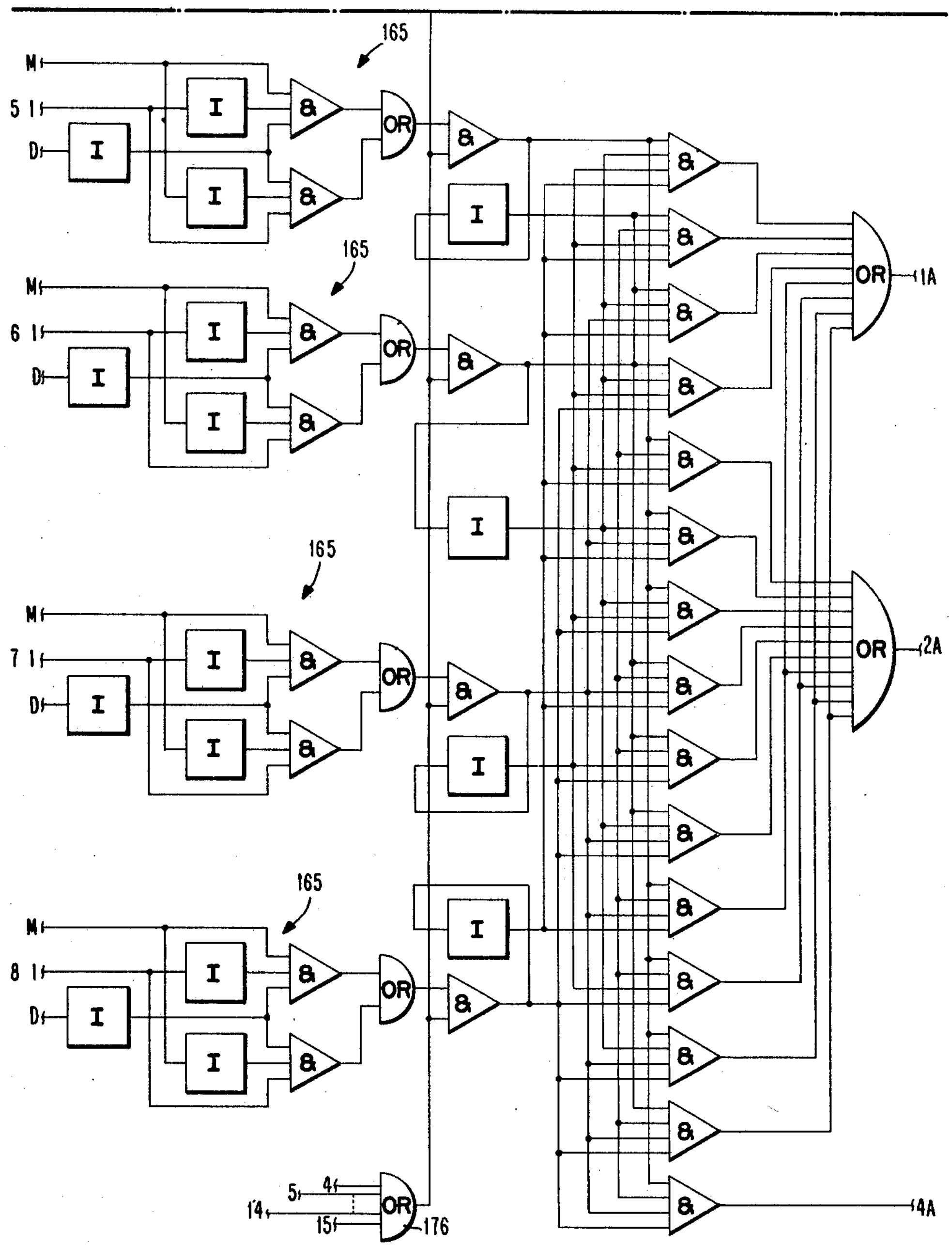

The correlation and decode operation will be best understood by referring to FIGS. 2, 4 and 7. In FIG. 2, the correlation and decode circuit 160 is shown schematically in block form while it is shown in detail in FIG. 4. FIG. 7 shows a typical reference word which is utilized during the correlation and decode operation. As previously indicated, the correlation and decode operation can take place starting at selection ring 4 time and continuing through selection ring 15 time if an Abort signal is not developed by the correlation compare circuit 250 shown in FIG. 2.

Hence at selection ring 4 time byte four of a reference word is addressed in storage 400 and sixteen bits of data are transferred to the correlation and decode circuit 160. With reference to FIG. 7, eight of these bits are Ideal bits and the other eight bits are Defining bits. At the same time that these sixteen bits are being transferred from data storage 400 to the correlation and decode circuit 160, eight bits of data are transferred from the measurement register 55 via logical AND circuits 56 and logical OR circuits 57 to the correlation and decode circuit 160. The logical AND circuits 56 are gated by a signal coming from position 4 of the selection ring 150. Hence, during byte four time eight bits of unknown data from the measurement register 55 are compared with eight bits of known data from byte four within the first reference word in data storage and the comparison operation is governed by eight bits of defining data also contained in byte four of the reference word.

The correlation and decode circuit 160 functions to perform the comparison and the number of mismatches developed during the comparison are accumulated in the mismatch summer 120. If the number of mismatches in the mismatch summer 120 does not exceed the correlation cut off value in the correlation cut off register 113 as determined by the correlation compare circuit 250, the selection ring 150 advances to position five and the sixteen bits of data in byte five of the reference word are transferred to the correlation and decode circuit 160. Simultaneously with the transfer of the bits of data from byte five of the reference word another set of eight measurement bits are transferred from the measurement register 55 to the correlation and decode circuit 160. The number of mismatches then developed during this second comparison is accumulated by the mismatch summer 120. If the combined number of mismatches resulting from the first and second comparisons still does not exceed the correlation cut off valve in the correlation cut off register 113, then the operation continues as the selection ring 150 advances to position six. The operation just described repeats until all 96 bits in the measurement register 55 have been compared with all 96 Ideal bits in bytes four through fifteen of the reference word. The last set of eight measurement bits in the measurement register 55 are shown as being passed to the correlation and decode circuit 160 via logical AND circuits 58 and logical OR circuits 57.

The details of the correlation and decode circuitry 160 are shown in FIG. 4. The correlation and decode circuitry 160 consists of eight blocks 165 of identical logic wherein each block has inputs for receiving a measurement bit, an Ideal bit and a Defining bit. Since each block consists of identical logical elements, only one block will be described in detail. The measurement bit passed by logical OR circuit 57 of FIG. 2 is directed to an inverter 168 and a logical AND circuit 169. A corresponding Ideal bit from data storage 400 is applied to an inverter 171 and a logical AND circuit 172. The Defining bit from data storage 400 is applied to an inverter 173 which has its output connected to inputs of the logical AND circuits 169 and 172. The outputs of the logical AND circuits 169 and 172 are connected to inputs of a logical OR circuit 174 which has its output connected to the input of a logical AND circuit 175. The logical AND circuit 175 is gated by a signal coming from the output of a logical OR circuit 176 having inputs from positions four through fifteen of the selection ring 150.

It will be recalled that the Defining bit indicates whether the result of the comparison between the Ideal bit and the measurement bit should be considered in the correlation process. If the Defining bit is a one, indicating that the corresponding Ideal bit is a "don't care" reference bit, then it is immaterial whether the Ideal bit compares with the measurement bit. If the Defining bit is a zero, then the Ideal bit must compare with the measurement bit or a mismatch will result. The logic just described provides for this mode of operation. If the Defining bit is a one, the inverter 173 will develop a signal for inhibiting the logical AND circuits 169 and 172 and thus a signal will not be passed to the logical OR circuit 174. However, if the Defining bit is a zero, then the inverter 173 will develop a signal for conditioning the logical AND circuits 165 and 172 and whether or not these logical AND circuits 165 and 172 will pass a signal depends upon whether the Ideal and measurement bits are identical. If the Ideal bit is a zero and the measurement bit is a one, it will result in a non-comparison, and logical AND circuit 169 will pass a signal to logical OR circuit 174. On the other hand, if the Ideal bit is a one and the measurement bit is a zero, it will result in a mismatch and logical AND circuit 172 will pass a signal to the logical OR circuit 174. Conversely, if the Ideal and measurement bits are both ones or zeros, neither logical AND circuit 169 nor 172 will pass a signal to the logical OR circuit 174.

In order to reduce the number of components involved in the correlation and decode circuitry 160 and the mismatch summer 120, the circuits for determining the number of mismatches developed by the correlation and decode circuitry 160 are divided into two groups with each group containing four sets of logic. The outputs of the four sets of logic 165 in each group are decoded into a three bit binary number including the bits 1, 2 and 4. The binary bit 1 appears at the output of a logical OR circuit 179 which has inputs from logical AND circuits 180, 181, 182, 183, 190, 191, 192 and 193. These logical AND circuits pass a signal when certain input conditions are present. For example, with respect to logical AND circuit 180, there must be an output from the logical AND circuit 175 and outputs from the inverters 196, 197, and 198. Thus, when the logical AND circuit 175 passes a signal, it is representative that a mismatch occurred with respect to the input signals applied to the first set of logic 165. By examining the input connections to the remaining logical AND circuits 181 through 194, it is possible to determine what their outputs represent. For example, if only a single mismatch occurs with respect to any of the four logic sets 165, then the logical OR circuit 179 must have an output. On the other hand, if two of the logic sets 165 develop mismatches simultaneously, the logical OR circuit 199 will have an output and if any three of the logic sets 165 have mismatches occurring simultaneously then both logical OR circuits 179 and 199 must have an output and if mismatches occur with respect to all four logic sets simultaneously, then logical OR circuits 179 and 199 will not have an output but there will be an output from the logical AND circuit 194. The other four logic sets 165 within the second group function in the same manner as the four logic sets within the first group. Thus, the correlation and decode circuit 160 will present a total number of mismatches for each set of eight bits compared to the mismatch summer 120 which will then accumulate the mismatches for each set of eight bits compared to result in a running total which is continuously compared with the correlation cut off value by means of the correlation compare circuit 250.

Since the comparison between the measurements in the measurement register 55 and the Ideal bits of a reference word in data storage 400 is made in twelve steps, eight bits at a time, the total number of mismatches during each step is transferred to the mismatch summer 120. Then, if during any step of the twelve steps, the total number of mismatches in the mismatch summer 120 exceeds the value in the correlation cut off register 113 as determined by the correlation compare circuitry 250, an Abort signal is generated to stop the correlation process, the selection ring 150 is reset and a new reference word is addressed to facilitate a new correlation operation.

Mismatch summer

Figure 5:
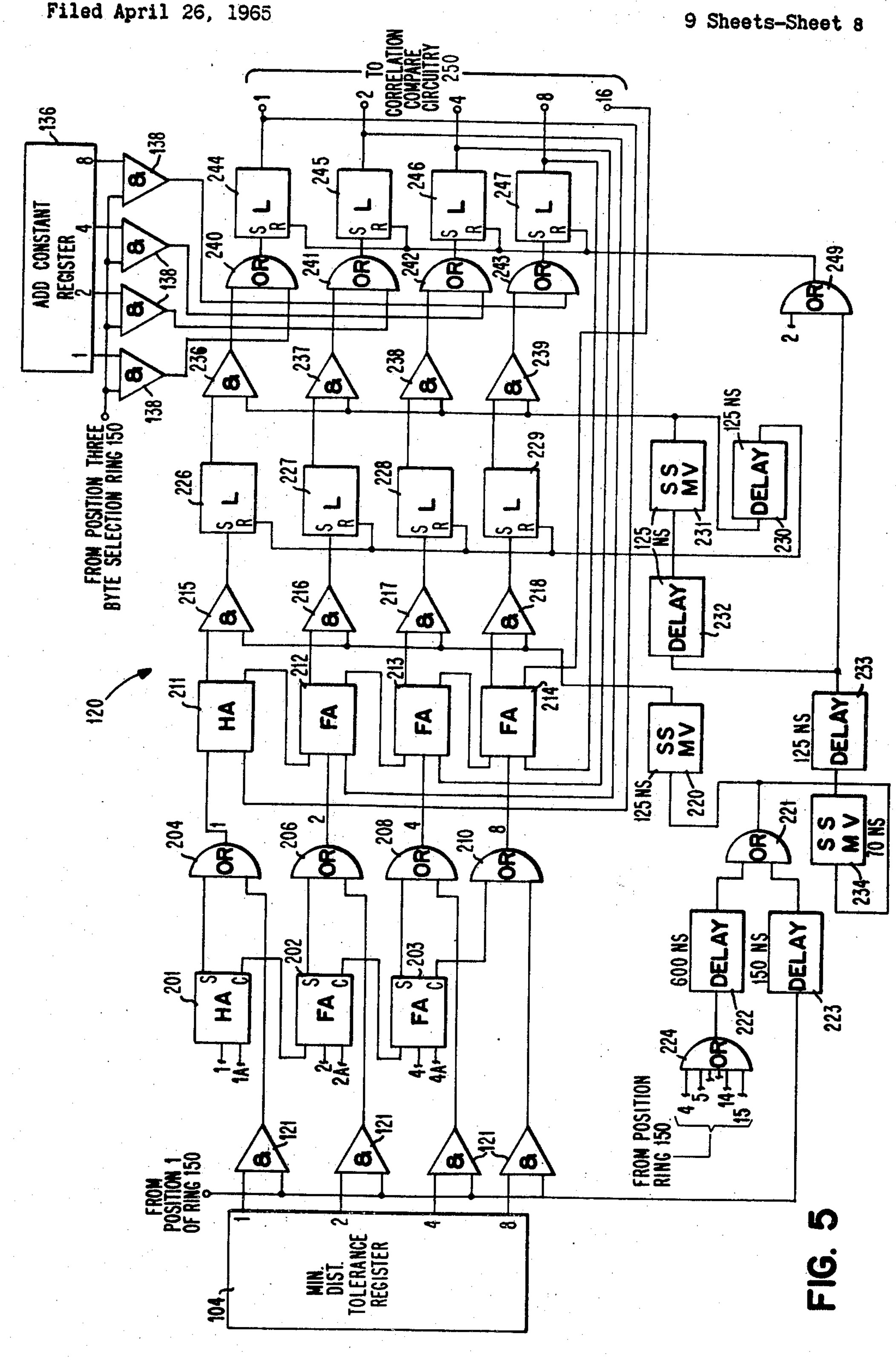
FIG. 5 is a detailed logic circuit diagram of the mismatch summer.

The details of the mismatch summer 120 are shown in FIG. 5. The binary outputs for forming the two 3 bit binary characters within the correlation and decode circuitry 160, FIG. 4, are connected to inputs of half adder 201 and full adders 202 and 203, as shown in FIG. 5. The sum output from half adder 201 is connected to an input of a logical OR circuit 204 which also has an input connected to the output of the logical AND circuit 121 corresponding to the binary 1 bit from register 104. The output of logical OR circuit 204 thus represents a binary 1. The carry output of half adder 201 is connected as an input to full adder 202. The sum output of full adder 202 is connected as input to a logical OR circuit 206. Logical OR circuit 206 also has an input from the logical AND circuit 121 which has one input connected to the binary 2 position of the minimum distance tolerance register 104, and an input from position 1 of ring 150. The output of logical OR circuit 206 thus represents a binary 2. In a similar manner, the carry output of the full adder 202 is connected as an input to full adder 203 which has its sum output connected to an input of logical OR circuit 208. Logical OR circuit 208 also has an input connected to the output of the logical AND circuit 121, the same having an input from the binary 4 position of the minimum distance tolerance register 104 and an input from position 1 of ring 150. Thus, the output from logical OR circuit 208 represents a binary 4. The carry out output of full adder 203 is connected as an input to logical OR circuit 210. The same also having an input connected to the output of logical AND circuit 121. Logical AND circuit 121 has one input from the binary 8 position of the minimum distance tolerance register 104 and an input from position 1 of the selection ring 150. Hence, the output of logical OR circuit 210 represents a binary 8.

The outputs of logical OR circuits 204, 206, 208 and 210 are connected to inputs of half adder 211 and full adders 212, 213 and 214 respectively. The sum outputs of half adder 211 and full adders 212, 213 and 214 are connected to inputs of logical AND circuits 215, 216, 217 and 218 respectively. These logical AND circuits each have an input connected to the output of a singleshot multivibrator 220. The input of the singleshot multivibrator 220 is connected to the output of a logical OR circuit 221 which has inputs connected to the outputs of delays 222 and 223. The input of delay 222 is connected to the output of a logical OR circuit 224 which has inputs connected to positions 4 through 15 of the selection ring 150. The input to delay 223 is connected to position 1 of the selection ring 150.

The outputs of logical AND circuits 215, 216, 217 and 218 are connected to the set inputs of latches 226, 227, 228 and 229 respectively. These latches are commonly reset by a signal passed by delay 230. Delay 230 has its input connected to the output of a singleshot multivibrator 231 which in turn has its input connected to the output of a delay 232. The delay 232 has its input connected to the output of a delay 233, the same having its input connected to the output of a singleshot multivibrator 234. The singleshot multivibrator 234 has its input connected to the output of the logical OR circuit 221.

Summarizing briefly at this point, the half adder 211 and the full adders 212, 213, 214 function to develop a total count for the bits coming from the correlation and decode circuits 160 and from the minimum distance tolerance register 104. The results are then transferred via the logical AND circuits 215, 216, 217 and 218 to latches 226, 227, 228 and 229. Thereafter, at a time determined by singleshot multivibrator 231, logical AND circuits 236, 237, 238 and 239 are conditioned to pass the respective states of latches 226, 227, 228 and 229 to latches 244, 245, 246 and 247 via logical OR circuits 240, 241, 242, and 243, respectively. The latches 244, 245, 246 and 247 can also be set via logical OR circuits 240, 241, 242 and 243 respectively by the value in the additive constant register 136. The binary outputs from the additive constant register 136 are connected to inputs of logical AND circuits 138 which have their outputs connected to inputs of the logical OR circuits 240, 241, 242 and 243 respectively. The logical AND circuits 138 each have an input connected to position 3 of the selection ring 150 so as to be conditioned for passing the additive constant value at selection ring 3 time.

The latches 244, 245, 246 and 247 have their reset terminals commonly connected to the output of a logical OR circuit 249. Logical OR circuit 249 has one input connected to position 2 of the selection ring 150 and another input connected to the output of delay 233. Thus, the latches 244, 245, 246 and 247 can be reset at selection ring 2 time or at any other time during which there will be an output from delay 233. However, it should be noted that delay 233, will never have an output during selection ring 3 time. The set outputs of the latches 244, 245, 246 and 247 and the carry output from full adder 214 are connected to corresponding inputs of the correlation compare circuitry 250.

Correlation compare circuitry

Figure 6:
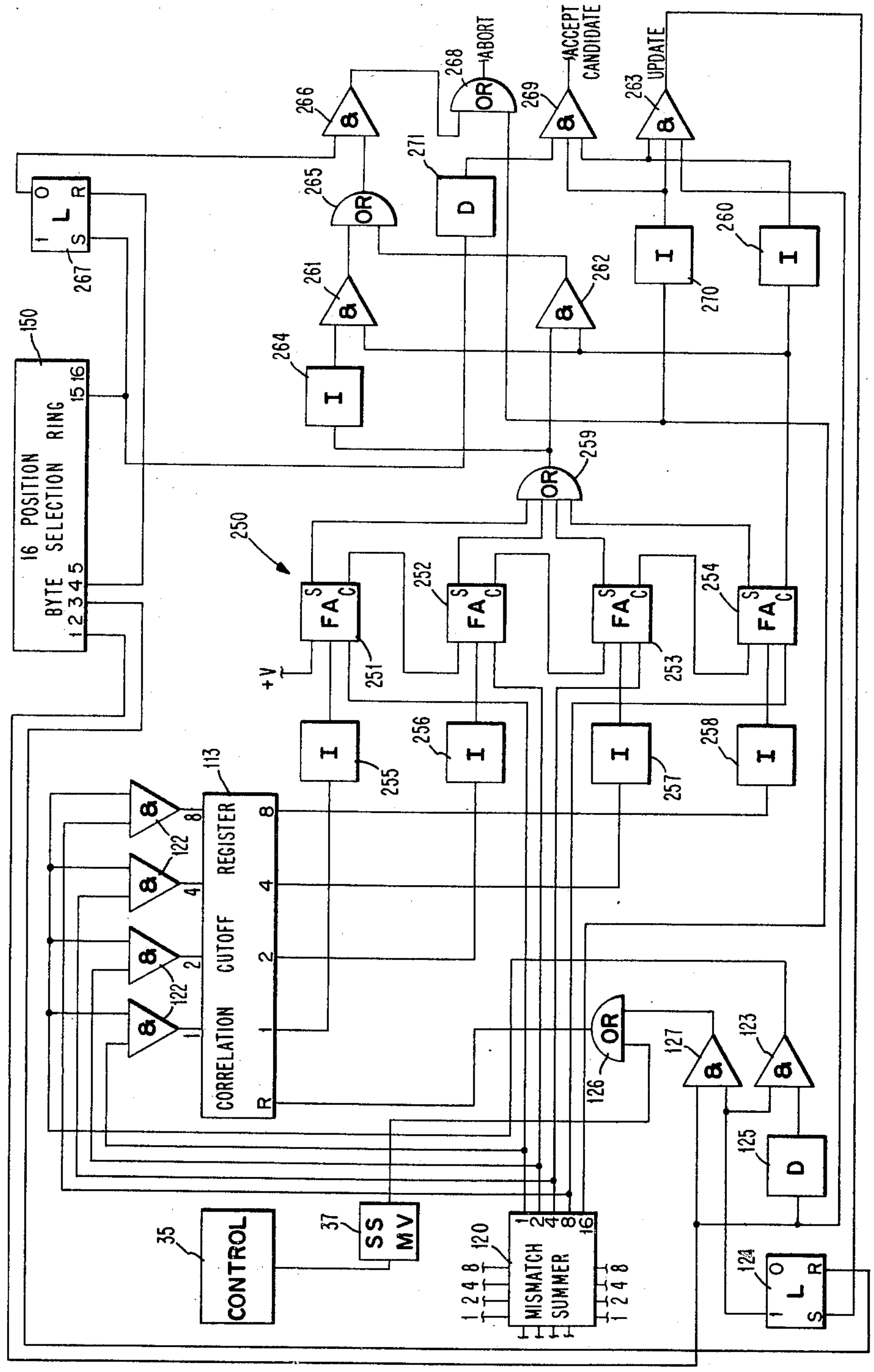
FIG. 6 is a detailed logic circuit diagram of the correlation compare circuitry.

The details of the correlation compare circuitry 250 are shown in FIG. 6. The correlation compare circuitry 250 functions to compare the value in the mismatch summer 120 with the value in the correlation cut off register 113. It will be recalled that the correlation cut off register 113 is initially loaded from the initial correlation value register 103 shown in FIG. 2 but not in FIG. 6. Thereafter, whenever a new correlation cut off valve is to be entered into register 113, it is entered via the logical AND circuits 122. The mismatch summer 120, of course, receives entries from the minimum distance tolerance register 104, from the additive constant register 136 and from the correlation and decode circuitry 160.

The correlation compare circuitry 250 includes full adders 251, 252, 253 and 254. The full adder 251 has one input connected to a positive voltage, an input connected to the output of an inverter 255, and an input connected to the binary 1 output of the mismatch summer 120. The inverter 255 has its input connected to the binary 1 output of the correlation cut off register 113. Thus, the full adder 251 functions to compare the binary 1 bit of the mismatch summer 120 with the binary 1 bit of the correlation cut off register 113. The positive voltage is the same as a one input to full adder 251. Therefore, if the 1 bit position of mismatch summer 120 is zero and the 1 bit position of the correlation cut off register 113 is one, the sum output is one and the carry output is zero. If the bit conditions are reversed then both the sum and carry outputs are ones. If both the mismatch summer and the correlation cut off register have one or zero outputs simultaneously, then the sum output is zero and the carry output is one.

The sum output of the full adder 251 is connected to an input of a logical OR circuit 259 and the carry output is connected to an input of full adder 252 which also has an input connected to the output of an inverter 256 and an input connected to the binary 2 output of the mismatch summer 120. The input to inverter 256 is connected to a binary 2 output of the correlation cut off register 113. Full adder 252 functions in the same manner as full adder 251 but has different inputs.

The sum output of the full adder 252 is connected to an input of the logical OR circuit 259 while its carry output is connected to an input of the full adder 253. The full adder 253 also has an input connected to the output of inverter 257 and an input connected to the binary 4 output of the mismatch summer 120. The inverter 257 has its input connected to the binary 4 output of the correlation cut off register 113. The sum output of the full adder 253 is connected to an input of logical OR circuit 259 and its carry output is connected to an input of full adder 254. Full adder 254 also has an input connected to the output of the inverter 258 an input connected to the binary 8 output of the mismatch summer 120. The inverter 258 has its input connected to the binary 8 output of the correlation cut off register 113. The sum output of the full adder 254 is connected to an input of logical OR circuit 259. The carry output of full adder 254 is connected to an input of inverter 260 and to inputs of logical AND circuits 261 and 262.

By inverting the binary outputs of the correlation cut off register 113, the full adders 251, 252, 253 and 254 function substantially as subtractors. If the number in the mismatch summer 120 is greater than the number in the correlation cut off register 113, a one output signal is passed by logical OR circuit 259 and the carry output from full adder 254 is a one. Whereas, if the two numbers are equal, the output from logical OR circuit 259 is a zero and the carry output of full adder 254 is a one. If the number in the mismatch summer 120 is less than the number in the correlation cut off register 113, the output of the logical OR circuit 259 is a one and the carry output of the full adder 254 is zero. As will be seen shortly, logic is provided to develop an Abort signal if the number in the mismatch summer 120 is greater than or equal to the number in the correlation cut off register 113. On the other hand if the number in the mismatch summer 120 is less than the number in the correlation cut off register 113, an Accept candidate signal is developed.

The output of the logical OR circuit 259 is connected to an input of logical AND circuit 262 and to an input of an inverter 264 which has its output connected to an input of logical AND circuit 261. The outputs of logical AND circuits 261 and 262 are connected as inputs to a logical OR circuit 265. The output of logical OR circuit 265 is connected to an input of logical AND circuit 266 which has its other input connected to the reset output of latch 267. Latch 267 has its set and reset inputs connected to positions 15 and 4, respectively, of the selection ring 150. Hence, latch 267 will be off during the entire correlation time and the logical AND circuit 266 will be conditioned for that period of time. The output of logical AND circuit 266 is connected to the input of a logical OR circuit 268 which also has an input connected to the binary 16 output of the mismatch summer 120.

By this arrangement, logical AND circuit 261 passes a signal if the values in the mismatch summer 120 and correlation cut off register 113 are equal. This signal causes logical OR circuit 268 to pass an Abort signal, if such equal condition occurs between selection ring 4 and 15 times. If the value in the mismatch summer 120 is greater, the logical AND circuit 262 passes a signal to develop the Abort signal. Additionally, any time the number in the mismatch summer 120 reaches 16, an Abort signal is developed. The output of logical OR circuit 268 is connected to the reset terminal of code register 130 and to an input of logical AND circuit 159 whose output is connected to the reset terminal of the selection ring 150 through logical OR circuit 158, FIG. 2. Hence, when there is an Abort signal present on the output of logical OR circuit 268, the code register 120 and selection ring 150 are reset.

When the value in the mismatch summer 120 is less than the value in the correlation cut off register 113, the carry output of the full adder 254 will be zero and this zero signal is passed to inverter 260 and to logical AND circuits 261 and 262. The output of the inverter 260 thus will be a one when the carry output of the full adder 254 is a zero. Further, when the carry output of the full adder 254 is a zero, the logical AND circuits 261 and 262 will be prevented from passing a signal to logical OR circuit 265. Hence, under these conditions an Abort signal cannot occur unless the value in the mismatch summer happened to be 16.

An Accept candidate signal is generated if the value in the mismatch summer 120 is less than the value in the correlation cut off register 113, and is not 16. Further, an Accept candidate signal will be developed only if the correlation process continues past selection ring 15 time. Of course, this can only occur if the Abort signal is not developed priorly. The output of the inverter 260 is connected to inputs of logical AND circuits 263 and 269. Logical AND circuit 263 functions to pass an Update signal and has additional inputs, one being connected to position 1 of the selection ring and the other being connected to the output of an inverter 270 which has its summer 120. Thus, if the value in the mismatch summer input connected to the binary 16 output of the mismatch has not reached 16 and the carry output of the full adder 254 is zero, which can only occur when the value in the mismatch summer 120 is less than the value in the correlation cut off register 113, the logical AND circuit 263 passes an Update signal. This Update signal is used to enter a new correlation value from the mismatch summer 120 into the correlation cut off register 113.

The logical AND circuit 269 in addition to the input from the output of inverter 260 also has an input connected to the output of inverter 270 and an input connected to the output of delay 271. The delay 271 has its input connected to position 15 of the selection ring 150. Thus, logical AND circuit 269 will have an output at selection ring 15 time delayed, if the value in the mismatch summer is less than the value in the correlation cut off register 113 and has not reached 16. The signal passed by logical AND circuit 269 is the Accept candidate signal. The Accept candidate signal, FIG. 2, is used for setting the latch 118 for gating the logical AND circuits 155 and thus pass the value from the mismatch summer 120 to the byte address portion of the address register 410, to condition logical AND circuits 109 for passing the decision word address to the word address portion of the address register 410, and to condition logical AND circuits 272 and 273 which have their outputs connected to inhibit drivers 402.

Updating the correlation cut off register

The value set into the correlation cut off register 113 from the initial correlation value register 103 will be updated at selection ring 1 time delayed only if logical AND circuit 263, FIG. 6, passes an Update signal. The output of logical AND circuit 263 is connected to the set terminal of latch 124. It will be recalled that the set output of latch 124 is connected to inputs of logical AND circuits 123 and 127. Logical AND circuit 123 also has an input connected to the output of delay 125 which has its input connected to position 1 of the selection ring 150. The output of logical AND circuit 123 is connected to inputs of logical AND circuits 122. The logical AND circuits 122 have their other inputs connected to the binary outputs 1, 2, 4 and 8 of the mismatch summer 120. It should also be recalled that the minimum distance tolerance value is entered into the mismatch summer 120 from the register 104 at selection ring 1 time. Thus, the value in the mismatch summer at selection ring 1 time delayed will consist of the number of mismatches which had occurred for the acceptable candidate plus the minimum distance tolerance value. If this number does not exceed 16 at selection ring 1 time delayed, then the value is entered into the correlation cut off register 113. It is thus seen that the value in the correlation cut off register 113 will be updated only if there is an acceptable candidate and if the mismatches occurring with respect to that acceptable candidate plus the minimum distance tolerance value does not exceed 16. By use of the minimum distance tolerance value, at least two candidates will always be developed so as to permit a minimum distance check to be made to determine whether or not the best candidate is a predetermined degree better than the second best candidate so as to insure positive identification of the unknown data set or character. Additionally, if it is necessary to perform some recovery operation in order to identify the unknown data set with greater certainty, it is only necessary to work with reference sets of known data which qualified as possibly identifying the unknown data set.

Entry of a candidate into the decision word

The address of the decision word in the register 102 is always available to the logical AND circuits 109. Thus, when there is an Accept candidate signal passed by logical AND circuit 269, FIG. 6, the logical OR circuits 110 pass this signal to condition the logical AND circuits 109, FIG. 2. The address in the decision word register 102 is thus passed via logical OR circuits 111 to the word address portion of the address register 410. With the decision word now addressed by the address register 410, the value in the mismatch summer, which is the total number of mismatches occurring for the acceptable candidate because this action ow described takes place at selection ring 15 time delayed, i.e., before the minimum distance tolerance value is added to the mismatch summer 120, is entered into the byte address portion of the address register 410. Thus, the byte in the decision word corresponding to the number of mismatches is addressed. The information written into this byte comes from the code register 130. The code register 130 contains the code of the reference word for the qualifying candidate which had been entered therein at selection ring 1 time. The code is passed via logical AND circuits 272 which have their outputs connected to the inhibit drivers 402 to thus be entered into storage 400. However, the logical AND circuits 272 will pass the data from code register 130 only if the byte position addressed does not already contain data.

It will be recalled that each data storage cycle includes a read cycle and a write cycle. The read cycle takes place first and consequently a check can be made as to whether or not that particular byte position already contains a code from a previous correlation operation. If the byte position of the decision word does not already contain a code, then the code from code register 130 will be entered into a byte via the logical AND circuits 272. However, if the byte position does contain a code, then the information from the code register 130 is not written into data storage 400 via the logical AND circuit 272, but the code already within that byte position is checked to determine whether or not it is the same as the code in the code register 130. If the two codes are the same then nothing takes place, but if they are not the same, a conflict bit is written into bit position 1 of that byte position. This conflict bit will then be noted later when scanning the decision word for determining the best candidate. Further, the conflicting identity code is saved. It can be stored in the same byte position already containing an identity code if the byte is large enough to accommodate it or it can be stored in spare byte positions provided in the decision word.

In order to determine whether or not the addressed byte position within the decision word already contains a code, the outputs from the seven sense latches 401 corresponding to the code identifying bits are connected to inputs of logical OR circuit 274. Additionally, the outputs of these sense latches, only the outputs for the first and seventh sense latch are shown, are connected to inputs of logical AND circuits 275 and 276 respectively and to inputs of inverters 278 and 279, respectively. The one bit output from the code register 130 is connected to inputs of logical AND circuit 275 and inverter 280 while the seventh bit position thereof is connected to inputs of logical AND circuit 276 and inverter 281. The outputs of inverters 278 and 280 are connected to the inputs of a logical AND circuit 282 and the outputs of inverters 279 and 281 are connected to inputs of logical AND circuit 283. The outputs of logical AND circuits 275 and 282 are connected to inputs of logical OR circuit 284 and the outputs of logical AND circuits 276 and 283 are connected to inputs of logical OR circuit 285. The outputs of logical OR circuits 284 and 285 are connected to inputs of a logical AND circuit 286 which also has inputs from the other five logical OR circuits not shown, corresponding to the logical OR circuits 284 and 285.

The output of logical AND circuit 286 is connected to the input of an inverter 287 which has its output connected to an input of logical AND circuit 273. The output of logical AND circuit 273 is connected to the inhibit driver for entering the flag bit into bit position 1 in storage. Logical AND circuit 273, it will be recalled, also has an input connected to the output of logical AND circuit 269, FIG. 6, for receiving the Accept candidate signal. It also has an input connected to the output of logical OR circuit 274 and hence will pass a signal only if data actually was read out from data storage to logical or circuit 74.

In order to prevent data from the code register 130 from being written into data storage 400, if a code is already in the byte position addressed, the output of logical OR circuit 274 is connected to an input of inverter 277 which has its output connected to inputs of logical AND circuits 272. The logical AND circuits 272 also have an input connected to the output of an inverter 288 which has its input connected to the sense latch 401 corresponding to a bit position 1 in which the conflict flags or bits are written.

It is thus seen that if an Accept candidate signal is developed the value in the mismatch summer 120 is entered into the byte address portion of the address register 410 via the logical AND circuits 155. Hence, the byte position of the decision word corresponding to the number of mismatches in the mismatch summer 120 is addressed so as to facilitate entry of the code identifying that particular reference word into the byte position of the decision word addressed. However, entry takes place only if that byte position is blank. If the byte position is not blank, then nothing will be entered into that byte position unless the code already in that byte position does not compare with the code in the code register 130. If such a situation exists, then a conflict flag or bit is written into bit position 1 of that byte position.

Scanning the decision word

When the last reference word to be correlated is read out from data storage 400, the last reference latch 141 is set. The last reference word in data storage contains a bit in the second bit position of byte 2 which indicates that it is the last reference word. The output of the sense latch 401 corresponding to the second bit position is connected to an input of logical AND circuit 140 which also has an input connected to position 2 of the selection ring 150. The output of logical AND circuit 140 is connected to the set input of the last reference latch 141. The set output of the last reference latch 141 is connected to inputs of logical AND circuits 112 which, as it will be recalled, also have inputs connected to position 1 of the selection ring 150. Thus after the last reference word has been correlated, the decision word in register 102 is transferred via logical AND circuits 109 and logical OR circuits 111 to the word address portion of the address register because logical AND circuits 109 will be conditioned by the signal passed by the logical AND circuits 112. Each byte position within the decision word will then be addressed sequentially as the selection ring 150 advances from position 1 through position 16.

The set output of the last reference latch 141 is also connected to an input of logical AND circuit 290 which also has an input connection to position 1 of the selection ring 150. The output of the logical AND circuit 290 is connected to the set input of the decision word latch 291, which has its reset input connected to the output of single shot multivibrator 37. Hence, the decision word latch 291 is always reset initially by a signal from the singleshot multivibrator 37 and is set at selection ring 1 time when the decision word is to be scanned for determining the best candidate.

The set output of the decision word latch 291 is connected to inputs of logical AND circuits 133, 292, 293, 294 and 295. Logical AND circuit 292 has its output connected to the set input of the first code latch 296 and to an input of logical AND circuit 305. Logical AND circuit 292 also has inputs connected to the output of logical OR circuit 274 and to the set output of the last reference latch 141. Consequently, the first code latch 296 is set only if the last reference latch 141 is set and the decision word latch 291 is set and there is an output from logical OR circuit 274.

Briefly summarizing, it is seen that with the decision word latch 291 set, the first code latch 296 thereafter becomes set after reading out the first code in the decision word starting at byte 1 and progressing toward byte 16. The first code read out of the decision word enters into code register 130 via the logical AND circuits 131 because these logical AND circuits are conditioned at this time by a signal passed by logical AND circuit 133 which is conditioned at this time because the first code latch 296 is not yet set, actually the timing conditions are quite close. The set output of the decision word latch 291 which is set at this time is connected to one input of logical AND circuit 133. Logical AND circuit 133 also has an input connected to the output of an inverter 297 the same having its input connected to the set output of the first code latch 296. The output of the logical AND circuit 133 is connected to an input of logical OR circuit 132 which has its output connected to inputs of logical AND circuits 131.

The code in the register 130 will be entered into the recognition register 500 only if the minimum distance criteria entered into the minimum distance check register and counter 300 has been met. The outputs of the code register 130 besides being connected to inputs of logical AND circuits 272 as previously mentioned are connected to inputs of logical AND circuits 298 which have their outputs connected to inputs of the recognition register 500. The logical AND circuits 298 also have a conditioning input connected to the output of a logical AND circuit 299. Logical AND circuit 299 has an input connected to the zero output of the minimum distance check register and counter and an input connected to position 16 of the selection ring 150. Thus, the code in register 130 will be entered into the recognition register 500 at selection ring 16 time only if there is a zero output from the minimum distance check register and counter 300.

It will be recalled that the minimum distance criteria value is entered into the minimum distance check register and counter 300 from register 105 via the logical AND circuits 128. The minimum distance check register and counter 300 is of the type well known in the art wherein the values can be entered in parallel to initially set the register and thereafter signals can be entered to subtract from the value therein. In this particular instance, the signals entered into the minimum distance check register and counter 300 for subtracting from the value therein are selectively passed by logical AND circuit 301. Logical AND circuit 301 has one input connected to the output of a logical OR circuit 302 which has inputs connected to positions 1 through 16 of the selection ring 150. Logical AND circuit 301 also has a conditioning input connected to the output of a logical AND circuit 303. Thus logical AND circuit 301 will pass signals from logical OR circuit 302 only if there is an output from logical AND circuit 303. Logical AND circuit 303 has an input connected to the set output of the first code latch 296 and an input connected to the reset output of second code latch 304 and an input connected to the output of inverter 288. It will be recalled that inverter 288 has its input connected to the output of the sense latch 401 corresponding to bit position 1 and this is the bit position in which conflict flags are written. Therefore, logical AND circuit 303 will pass a signal for conditioning logical AND circuit 301 only if the first code latch 296 is set, the second code latch 304 is not set and a flag bit is not written in bit position 1 of the byte containing the code residing in the code register 130. Hence upon the continued scanning of the decision word after the code of the first candidate encountered therein has been read out to code register 130, subtracting entries will be made into the minimum distance check register and counter 300 for each byte position occurring after the encounter of the first identifying code up to the time of encountering a second identifying code.

The second code latch 304 has its set input connected to the output of the logical AND circuit 305 which has an input connected to the output of logical AND circuit 292 which, as it will be recalled, is also used for passing a signal to set the first code latch 296. Logical AND circuit 305 also has an input connected to the set output of the first code latch 296 and an input connected to the output of inverter 287. Thus, the second code latch 304 can only be set after the first code latch 296 has been set and if the code for the second best identifying reference word is different from the code in the code register 130. The circuitry for comparing the code already in register 130 with the code being read out of data storage 400 has been previously described. Therefore, if the code for the second best identifying reference is the same as the code for the first best identifying reference, then the second code latch 304 is not set and entries into the minimum distance check register and counter 300 continue as the scanning of the decision word continues. However, once the second code latch 304 is set, logical AND circuit 303 is no longer conditioned and therefore logical AND circuit 301 will not pass a signal to minimum distance check register and counter 300.

If the minimum distance check register and counter has counted backwards to zero prior to reaching the second best different code in the decision word; then the code in the register 130 is entered into the recognition register 500. If the minimum distance check register and counter 300 is at other than zero after the second code latch 304 has been set, a signal indicating this fact is passed to logical AND circuit 293 by inverter 306. Logical AND circuit 293 it will be recalled also has an input connected to the output of the decision word latch 291 and it also has an input connected to position 16 of the selection ring 150. The output of logical AND circuit 293 is connected to the input of rescan counter 307. The output of the rescan counter 307 is connected to a rescan compare circuit 308 which compares the value in the rescan counter with a value in rescan register 309.

The rescan register 309 determines how many rescans should be made if the minimum distance criteria has not been met by any one scan. If a character or unknown set of data has not been positively identified within the number of scans as determined by the value in the rescan register 309, then the rescan compare circuit 308 passes a signal to logical AND circuit 295 which has its output connected to a line marking device 550 for marking the line on the document 15 which contains the character that could not be positively identified. In addition to the input from rescan compare circuit 308, the logical AND circuit 295 also has an input connected to position 16 of the selection ring 150 and as previously mentioned, also has an input connected to the output of the decision word latch 291.

In order to provide a rescan signal to the scanner control 20, the output of the rescan compare circuit 308 is connected to an input of inverter 310 which has its output connected to an input of logical AND circuit 294. Logical AND circuit 294 also has inputs connected to position 16 of the selection ring 150 and to the output of the decision word latch 291. Thus, after scanning a decision word, if the minimum distance criteria has not been met and the value in the rescan counter 307 is less than the value in the rescan register 309, the rescan signal will be passed by logical AND circuit 294 to scanner control 20. It should be noted that the code register 130 is reset at selection ring 16 time. The output of position 16 of the selection ring 150 is also connected to the input of a delay 311 which has its output connected to the reset inputs of the first and second code latches 296 and 304 respectively.

From the foregoing, it is seen that this invention provides apparatus for identifying unknown sets of data to a very high degree of certainty. Further, it is seen that in order to achieve this high degree of certainty at least two candidates for identification are always developed. A check is then made to determine whether the best candidate is a predetermined degree better than the second best candidate. If the check is favorable to the best candidate, then the best candidate is accepted as identifying the unknown data set. Otherwise, a rescan occurs and this can be done a predetermined number of times with new known criteria and in some instances an attempt will be made to improve the validity of the unknown criteria, i.e., by changing scanner parameters and clipping levels to result in better digitized video data. If the unknown data set cannot be identified with certainty after a predetermined number of rescans, a reject signal is generated.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Data correlating apparatus comprising:

means for developing an unknown set of digital data;

means for comparing said unknown set of digital data with sets of known digital data and generating digital signals for each mismatch between any digital data of said unknown and known sets of digital data;

mismatch accumulating means for registering a total number of mismatches resulting from the comparison of said unknown set of digital data with any one of said known sets of digital data;

means for accepting a first known set of data as a first candidate for identifying the unknown set of data when the number of mismatches resulting from the comparison of said unknown and known sets of data is below a predetermined number; and means for modifying said accepting means to change said predetermined number after said first known set of data has been accepted to enable the acceptance of a second known set of data as a candidate for identifying said unknown set of data.

2. The data correlating apparatus of claim 1 further comprising:

means for determining whether said first known set of data identifies said unknown set of data a predetermined degree better than said second known set of data identifies said unknown set of data.

3. Data correlating apparatus comprising:

means for generating an unknown set of data in response to scanning indicia on documents;

means for storing said unknown set of data to permit correlation of the same with known sets of data;

means for storing known sets of data;

correlation means connected to correlate in succession known sets of data with said unknown set of data;

mismatch accumulating means connected to said correlation means for accumulating a total number of mismatches between said unknown set of data and any one of said known sets of data;

correlation value storage means;

comparing means connected to compare the value in said mismatch accumulating means with the value in said correlation value storage means and operable upon completion of correlation between said unknown and one of said known sets of data to generate an accept signal if the value in said mismatch accumulating means is less than the value in said correlation value storage means and to generate a non-accept signal if at any time the value in said mismatch accumulating means is greater than or equal to value in said correlation value storage means; and means for modifying the value in said correlation value storage means after an accept signal is generated by said comparing means.

4. Data correlating apparatus comprising:

means for generating an unknown set of data in response to scanning indicia on documents;

storage means for storing a plurality of known data sets together with identities thereof and having an area for storing in ranking order identities of the known data sets according to magnitudes of the degree of correlation;

correlating means connected to receive said unknown data set and said known data sets successively from storage and to provide a magnitude for indicating the degree of correlation between said unknown data set and each of said known data sets; and means for entering identities of said known data sets in said area of said storage means in the order corresponding to the magnitude determined by said correlation means;

means for checking if the order position to be entered already contains an identity different from the identity to be entered.

5. Data correlation apparatus comprising:

a correlation cut off register;

means for entering an initial value into said correlation cut off register;

mismatch accumulating means for registering a running total of mismatches during correlation of an unknown data set with a known data set;

means for correlating an unknown data set successively with known data sets, said correlating means being connected to said mismatch accumulating means to provide the same with a number of mismatches occurring during the correlation operation;

correlation compare means connected to compare the number of mismatches in said mismatch accumulating means resulting from the correlation between said unknown set of data and one of said known sets of data with the value in said correlation register and for developing a signal to terminate the correlation process if the value in said mismatch accumulating means ever becomes equal to or greater than the value in said correlation register and for developing a signal for accepting the identity of the known data set being correlated if at the end of the correlation operation the value in said mismatch accumulating means does not exceed the value in the correlation register; and means responsive to said correlation compare means developing an accept signal for changing the value in said correlation register.

6. Data correlation apparatus comprising:

data storage means having known data sets arranged therein according to words and each word constituting a known data set contains a predetermined number of bytes with a predetermined number of bit positions within each byte and at least one of said bytes contains the identity of the corresponding known data set and having a decision word with bytes for receiving identities of said known data sets;

an address register having a word address section connected to address words within said storage means and a byte address section for addressing bytes forming said words;

resettable selection ring having a predetermined number of positions and connected to said byte address section to facilitate addressing in succession each byte within a word;

means for selectively entering word addresses of known data sets into said word address section of said address register;

means for generating an unknown set of data in response to scanning indicia on documents;

means for storing said unknown set of data to permit correlation of the same with known sets of data;

correlating means connected to said means for storing said unknown set of data and to said data storage means to receive known sets of data therefrom as words and bytes within words are addressed therein through said address register and to develop a mismatch whenever a data bit within said unknown data set does not compare with a data bit in said known data set;

a code register connected to said data storage means to receive identities of said known data sets as they are made available to said correlating means;

mismatch accumulating means connected to said correlation means for accumulating the mismatches occuring during the correlation process;

a correlation cut off register for containing a correlation cut off value;

correlation compare means connected to said mismatch accumulating means and to said correlation cut off register to develop an abort signal for stopping the correlation process any time the number of mismatches in said mismatch accumulating means is equal to or exceeds the value in said correlation cut off register and for developing an accept candidate signal if the number of mismatches in said mismatch accumulating means is less than the value in said correlation cut off register at the completion of the correlation process of said known data set with said unknown data set;

means responsive to said abort signal for resetting said selection ring;

means responsive to said correlation compare means developing an accept candidate signal for entering the address of said decision word into said word address section;

means responsive to said correlation compare means developing an accept candidate signal for excluding entry of data from said selection ring and for entering the value in said mismatch accumulating means into said byte address section; and means responsive to said correlation compare means developing an accept candidate signal for entering the data in said code register into the decision word and byte position thereof addressed by the value entered from said mismatch accumulating means.

7. The data correlation apparatus of claim 6 further comprising:

means for entering a normalizing value into said mismatch accumulating means prior to a correlation operation.

8. The data correlation apparatus of claim 6 further comprising:

means for changing the value in said correlation cut off register after a first accept candidate signal has been generated by said correlation compare means.

9. The data correlation apparatus of claim 6 further comprising:

means for comparing the data in said code register with any data in the byte position of the decision word addressed by the value in said mismatch accumulating means; and means for recording a conflict indication in data storage if there is data in said byte position which is different from data in said code register.

10. The data correlating apparatus of claim 6 further comprising:

means for determining that all known data sets have been correlated with said unknown data set; and means connected to said determining means and operable to enter the address of said decision word in said word address section upon completion of the correlation of all known data sets with said unknown data set to enable scanning of the byte positions in said decision word.

11. The data correlating apparatus of claim 10 further comprising:

a recognition register connected to receive data from said code register;

means for entering into said code register the first encountered identity when scanning said decision word; and checking means operative to provide a signal for gating data from said code register into said recognition register if the second identity encountered in said decision word is at least a predetermined number of byte positions away from the byte position containing said first encountered identity.

12. The data correlating apparatus of claim 11 further comprising:

means for generating a re-scan signal if said second encountered identity is less than said predetermined number of bytes away from said first encountered identity in said decision word.

13. A data correlating apparatus of claim 12 further comprising:

means for developing a reject signal if a second encountered identity in said decision word is less than said predetermined number of byte positions away from the byte position of a first encountered identity within said decision table after a predetermined number of re-scan signals have been generated.

References Cited

UNITED STATES PATENTS 3,267,431 8/1966 Greenberg et al. ----- 340—46.3

DARYL W. COOK, Primary Examiner

ROBERT F. GNUSE, Assistant Examiner